(12) United States Patent
Liang et al.

(10) Patent No.: US 7,523,493 B2
(45) Date of Patent: *Apr. 21, 2009

(54) VIRUS MONITOR AND METHODS OF USE THEREOF

(75) Inventors: Yung Chang Liang, Cupertino, CA (US); Yi Fen Chen, Pasadena, CA (US)

(73) Assignee: Trend Micro Incorporated (JP)

( * ) Notice: Subject to any disclaimer, the term of this patent is extended or adjusted under 35 U.S.C. 154(b) by 778 days.

This patent is subject to a terminal disclaimer.

(21) Appl. No.: 10/684,330

(22) Filed: Oct. 9, 2003

(65) Prior Publication Data

US 2005/0050338 A1  Mar. 3, 2005

Related U.S. Application Data

(60) Provisional application No. 60/481,313, filed on Aug. 29, 2003.

(51) Int. Cl.
  G06F 15/16 (2006.01)
  G06F 9/00 (2006.01)
  G06F 17/00 (2006.01)
  G06F 12/14 (2006.01)
  G06F 11/00 (2006.01)
  G06F 12/16 (2006.01)
  G06F 15/18 (2006.01)

(52) U.S. Cl. .................. 726/13; 726/24; 713/188
(58) Field of Classification Search ............ 726/13, 726/24; 709/224; 713/188
See application file for complete search history.

(56) References Cited

U.S. PATENT DOCUMENTS

| 5,485,575 A | 1/1996 | Chess et al. |
| 5,548,725 A | 8/1996 | Tanaka et al. |
| 5,623,600 A | 4/1997 | Ji et al. |
| 5,832,208 A | 11/1998 | Chen et al. |
| 5,889,943 A | 3/1999 | Ji et al. |

(Continued)

FOREIGN PATENT DOCUMENTS

EP  1 335 559 A2  8/2003

(Continued)

OTHER PUBLICATIONS

White et al. "Anatomy of a commercial- Grade Immune System." Proceedings of the 9th International virus Bulletin Conference, Sep./Oct. 1999; pp. 1-28.*

(Continued)

Primary Examiner—Kambiz Zand
Assistant Examiner—Jason K Gee
(74) Attorney, Agent, or Firm—Beyer Law Group LLP

(57) ABSTRACT

A network level virus monitoring system capable of monitoring a flow of network traffic in any of a number of inspection modes depending upon the particular needs of a system administrator. The monitoring provides an early warning of a virus attack thereby facilitating quarantine procedures directed at containing a virus outbreak. By providing such an early warning, the network virus monitor reduces the number of computers ultimately affected by the virus attack resulting in a concomitant reduction in both the cost of repair to the system and the amount of downtime. In this way, the inventive network virus monitor provides a great improvement in system uptime and reduction in system losses.

20 Claims, 20 Drawing Sheets

U.S. PATENT DOCUMENTS

| | | | |
|---|---|---|---|
| 5,918,008 A * | 6/1999 | Togawa et al. | 726/24 |
| 5,920,698 A | 7/1999 | Ben-Michael et al. | |
| 6,269,400 B1 * | 7/2001 | Douglas et al. | 709/224 |
| 6,338,141 B1 | 1/2002 | Wells | |
| 6,480,471 B1 | 11/2002 | VanZante et al. | |
| 6,711,686 B1 | 3/2004 | Barrett | |
| 6,892,241 B2 | 5/2005 | Kouznetsov et al. | |
| 6,910,134 B1 | 6/2005 | Maher et al. | |
| 7,010,807 B1 | 3/2006 | Yanovsky | |
| 7,080,407 B1 * | 7/2006 | Zhao et al. | 726/24 |
| 7,117,533 B1 * | 10/2006 | Libenzi | 726/24 |
| 7,331,061 B1 * | 2/2008 | Ramsey et al. | 726/23 |
| 2002/0107953 A1 | 8/2002 | Ontiveros et al. | |
| 2002/0133586 A1 | 9/2002 | Shanklin et al. | |
| 2002/0156894 A1 | 10/2002 | Suorsa et al. | |
| 2003/0055962 A1 | 3/2003 | Freund et al. | |
| 2003/0055994 A1 | 3/2003 | Hermann et al. | |
| 2003/0145228 A1 | 7/2003 | Suuronen et al. | |
| 2003/0191957 A1 * | 10/2003 | Hypponen et al. | 713/200 |
| 2003/0191963 A1 | 10/2003 | Balissat et al. | |
| 2003/0208687 A1 * | 11/2003 | Liang et al. | 713/200 |
| 2004/0042418 A1 | 3/2004 | Hamada et al. | |
| 2004/0139179 A1 | 7/2004 | Beyda | |
| 2004/0139196 A1 | 7/2004 | Butler et al. | |
| 2004/0148281 A1 | 7/2004 | Bates et al. | |
| 2006/0212572 A1 | 9/2006 | Afek et al. | |

FOREIGN PATENT DOCUMENTS

| | | |
|---|---|---|
| WO | 03/14932 | 2/2003 |

OTHER PUBLICATIONS

Hameroff, "A holistic approach to enterprise security", Unisys World, 'Online! May 2003.

White et al., "Anatomy of a Commercial-Grade Immune System", IBM Research White Paper, Jun. 1999.

Office Action; Mar. 19, 2007; U.S. Appl. No. 10/683,874.

Office Action; Jan. 31, 2007; U.S. Appl. No. 10/683,582.

White et al., "Anatomy of a Commerical-Guide Immune System", Proceedings of the 9th International Virus Bulletin Conference, Sep./Oct. 1999, pp. 20-3-228.

Cass, S., "Anatomy of Malice" IEEE Spectrum, vol. 35, Issue 11, Nov. 2201; pp. 56-60.

Office Action; Jan. 31, 2007; U.S. Appl. No. 10/683,584.

Office Action; Nov. 20, 2006; U.S. Appl. No. 10/683,873.

Office Action; Nov. 6, 2006; U.S. Appl. No. 10/683,579.

* cited by examiner

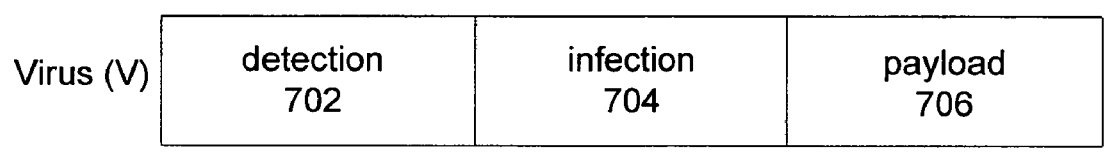
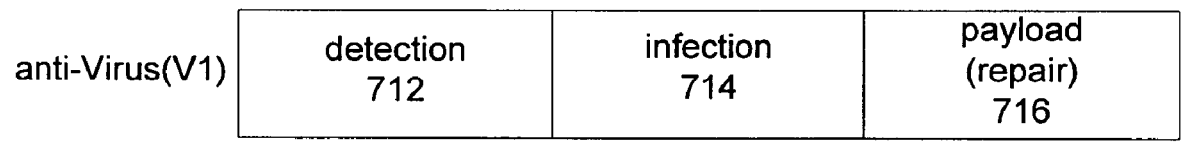
FIG. 7

VIRUS MONITORING SYSTEM - INLINE MODE

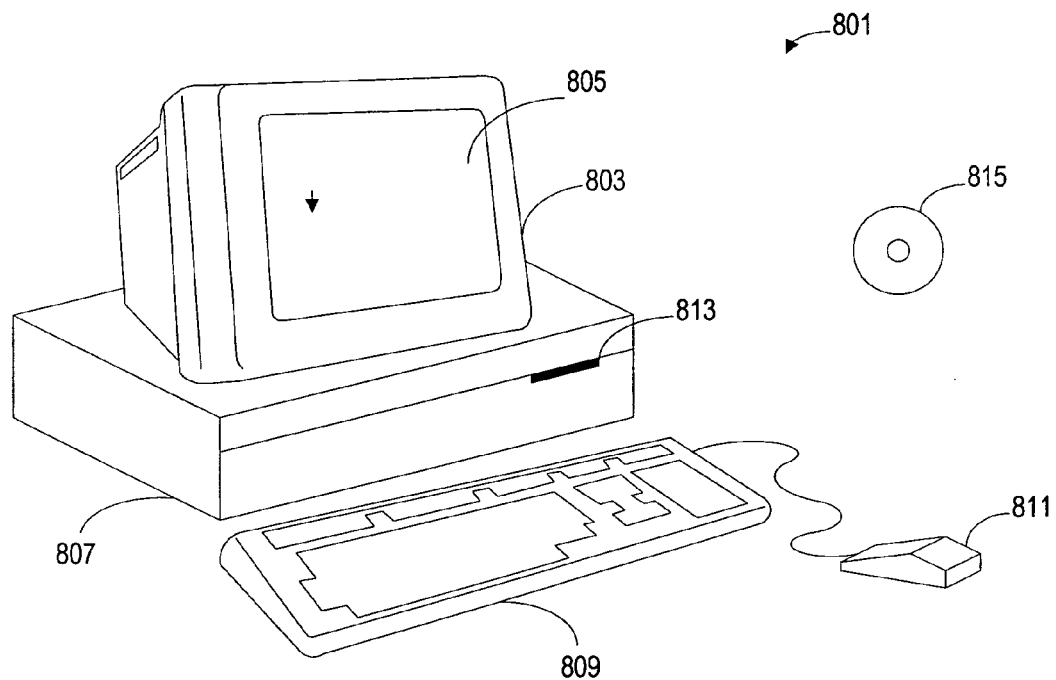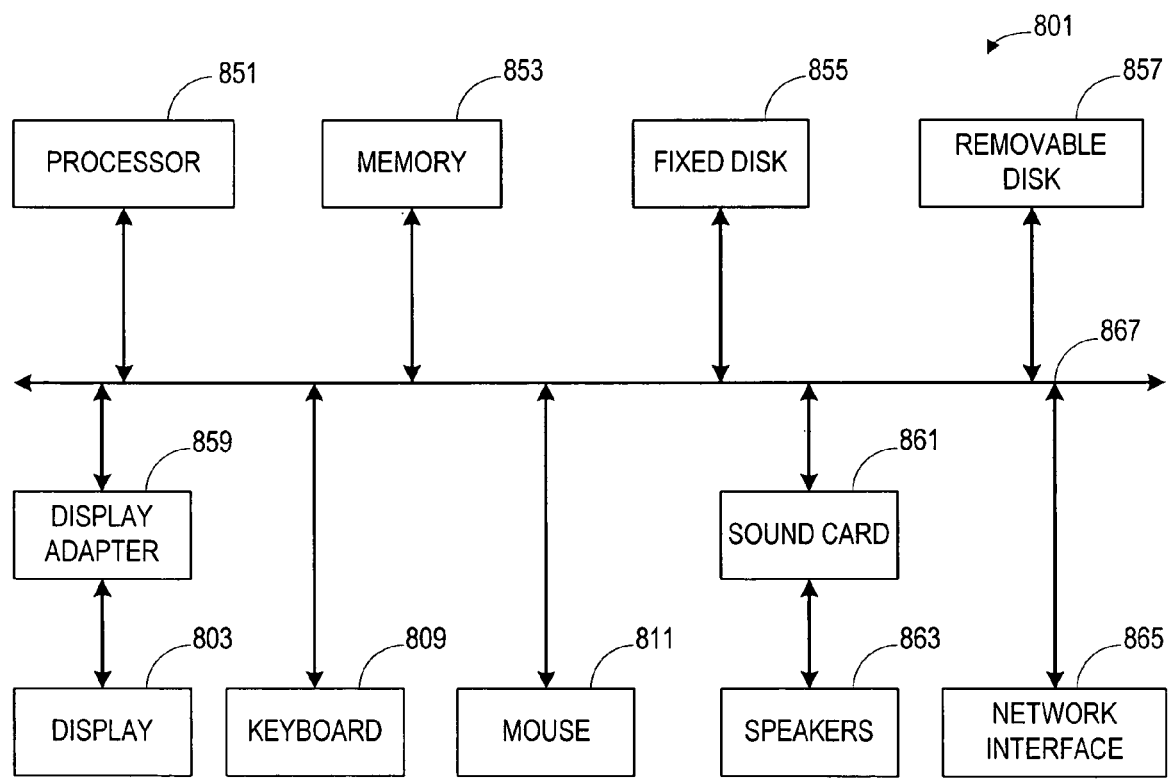
FIG. 19

VIRUS MONITOR AND METHODS OF USE THEREOF

CROSS REFERENCE TO RELATED APPLICATIONS

This application takes priority under 35 U.S.C. §119(e) of U.S. Patent Application No. 60/481,313 filed Aug. 29, 2003 naming Liang et al. as inventor(s) entitled "VIRUS MONITOR AND METHODS OF USE THEREOF" which is also incorporated herein by reference for all purposes. This application is also related to the following co-pending U.S. Patent applications, which are filed concurrently with this application and each of which are herein incorporated by reference, (i) U.S. patent application Ser. No. 10/683,528, entitled "AUTOMATIC REGISTRATION OF A VIRUS/WORM MONITOR IN A DISTRIBUTED NETWORK" naming Liang et al as inventors; (ii) U.S. patent application Ser. No. 10/683,579, entitled "NETWORK TRAFFIC MANAGEMENT BY A VIRUS/WORM MONITOR IN A DISTRIBUTED NETWORK", naming Liang et al as inventors; (iii) U.S. patent application Ser. No. 10/683,873, entitled "NETWORK ISOLATION TECHNIQUES SUITABLE FOR VIRUS PROTECTION", naming Liang et al as inventors; and (iv) U.S. patent application Ser. No. 10/683,874, entitled "ANTI-VIRUS SECURITY POLICY ENFORCEMENT", naming Liang et al as inventors; (v) U.S. patent application Ser. No. 10/683,584, entitled "ANTI-COMPUTER VIRAL AGENT SUITABLE FOR INNOCULATION OF COMPUTING DEVICES", naming Liang et al as inventors; and (vi) U.S. patent application Ser. No. 10/683,554, entitled "INNOCULATION OF COMPUTING DEVICES AGAINST A SELECTED COMPUTER VIRUS", naming Liang et al as inventors.

BACKGROUND OF THE INVENTION

The present invention relates generally to information analysis and screening using a computer, and, specifically, to configurations and methods for intercepting and removing computer viruses and worms from transmitted media.

With the rising popularity of the Internet, there are now millions of users connecting to the Internet daily from their host computers to conduct e-commerce transactions, perform searches for information and/or download executable programs to enhance the capability and performance of their own host computers. The interaction between these users and the other host servers on the Internet generally involves the transfer of some amount of data, which may include both static displayable information and executable computer code. Generally speaking, static displayable information refers to static information to be displayed at the host computer while executable code or an "executable" refers to computer instructions configured to be executed at the host computer to perform some task.

In general, the vast majority of the downloadable data from the Internet represents useful or at least non-harmful content material. However, there exists a class of executable code that, if downloaded and executed at host computers, may wreak havoc with the operating system, the hardware, and/or other software of the host computers. These executables include what are commonly referred to as computer viruses and/or worms.

A computer virus is a piece of programming code usually disguised as something else that causes some unexpected and usually undesirable event (for the victim). Viruses are often designed so that they automatically spread to other computer users across network connections. For instance, viruses can be transmitted by sending them as attachments to an e-mail message, by downloading infected programming from other web sites, and/or by importing them into a computer from a diskette or CD-ROM. The source application that deals with the e-mail message, downloaded file, or diskette is often unaware of the virus. Some viruses wreak their effect as soon as their code is executed; other viruses lie dormant until circumstances cause their code to be executed by the computer. Some viruses can be quite harmful, causing a hard disk to require reformatting or clogging networks with unnecessary traffic.

Computer worms are very similar to viruses in that a worm is a small piece of software that uses computer networks and security holes to replicate itself. A copy of the worm scans the network for another machine that has a specific security hole. Once the security hole has been found, the worm copies itself to the new machine using the security hole, and then uses the newly infected computer to start replicating itself in order to infect other computers connected thereto. Although a worm does not alter files but resides in active memory and duplicates itself, the worm uses parts of an operating system that are automatic and usually invisible to the user. Therefore, it is common for worms to be noticed only when their uncontrolled replication consumes system resources, slowing or halting other tasks.

To combat worms, users and administrators of computer networks (such as corporate local area networks or wide area networks) have long employed a variety of tools designed to detect and block worms from infecting a computer system. In a corporate local area network (LAN), for example, network administrators may employ proxy servers (which are disposed between the host computers of the LAN and the Internet) as well as individual computers to perform any of a number of defense strategies designed to prevent infection by a worm. One such defense strategy relies upon behavioral monitoring of computer actions. In behavioral monitoring, a historical database of actions taken by every computer is maintained that is then used by a monitoring program (heuristic engine) to compare to current actions taken by a particular computer. In those cases where current actions are deemed by the behavior monitoring program to be substantially different from the historical norm, the behavioral monitoring program flags that particular computer as being possibly infected by a worm. Once so flagged, appropriate actions can be taken.

In day-to-day efforts against computer viruses and other terminal device viruses, an end user is constantly looking for ways to inoculate against such viruses. Even in the case of corporate networks that are closely guarded by an anti-virus firewall and various other virus protection software and protocols, some viruses still manage to penetrate and infect the network resulting in substantial harm since conventional anti-virus technology generally relies on already identified viruses. In particular, conventional anti-virus protection is usually effective against known computer viruses, but may be ineffective in blocking unknown viruses. Therefore, terminal devices such as computers connected to a local area network (LAN) or wide area network (WAN) are generally unable to include effective anti-virus protection against unknown viruses using conventional anti-virus software.

When the terminal device or computer connected to a network is subject to attack by an unknown virus penetrating into the network, it is the responsibility of network managers to guard against such attacks and the restore the network to normal operating status as quickly as possible. The level of preparedness in a network is dependent upon knowing the probability of a virus to successfully penetrate the corporate network.

Intrusion Detection System (IDS) products neutralize the network-type attacks by scanning for abnormal network packets at protocols layers, including a method called Application Behavior Monitoring (ABM) at the host base IDS. ABM keeps track of behavioral patterns of target applications and protects the network system by allowing the benign (known) behavior patterns by disallowing or blocking and the unknown or malign ones.

Conventional anti-virus software sets a particular alert level to early detection of virus outbreaks for system administrators of network systems. The setting of the alert level becomes very important. If the alert level is set too low, it may invite an erroneous determination of a computer virus such that benign applications are deemed viral by mistake. If the alert level is set too high, certain computer viruses will be undetected and allowed into the network.

Conventional anti-virus software still relies on the support system at the anti-virus service provider to generate cures. Such practice is heavily reliant on the response time at the service provider in procuring the virus sample, implementing the virus analysis, generating the appropriate cures, and deploying them to the end users. Though such support systems may be effective at certain levels, certain end users (such as system administrators of corporate networks) still require solutions that provide better lead time and effectiveness in countering sudden outbreaks of computer viruses.

There is thus a general need in the art for a network level anti-virus method and system overcoming at least the aforementioned shortcomings in the art. In particular, there is a need in the art for an anti-virus method and system having multilevel anti-virus functions for anticipating and detecting computer virus outbreaks.

SUMMARY OF THE INVENTION

To achieve the foregoing, and in accordance with the purpose of the present invention, a system and method for monitoring a network for computer viruses is described.

In a first embodiment, in a distributed network of interconnected computing devices, a network virus monitor is described. The network virus monitor includes a virus sensor operable in a number of modes arranged to detect a computer virus in the network such that the bandwidth of the network is substantially unaffected in a first mode wherein when the virus sensor detects the computer virus the virus sensor switches to a second mode such that only those data packets infected by the computer virus are not returned to the network.

In another embodiment of the invention, a method of monitoring a distributed network of computing devices for a computer virus is described made operable by at least the following operations. At a virus monitor coupled to the distributed network, monitoring a flow of data packets in the network for the computer virus without substantially reducing the flow of data packets thereby preserving network bandwidth in a standby mode, determining that at least one of the monitored data packets is infected with the computer virus, and monitoring the flow of data packets such that the infected data packets are not returned to the flow of data packets in an inline mode based upon the determining.

In yet another embodiment, computer program product for monitoring a distributed network of computing devices for a computer virus is disclosed. The computer program product includes computer code for monitoring a flow of data packets in the network for the computer virus without substantially reducing the flow of data packets thereby preserving network bandwidth in a standby mode, computer code for determining that at least one of the monitored data packets is infected with the computer virus, computer code for monitoring the flow of data packets such that the infected data packets are not returned to the flow of data packets in an inline mode based upon the determining, and computer readable medium for storing the computer code.

These and other aspects and advantages of the present invention will become apparent upon analysis of the following detailed description and studying the various figures and drawings.

BRIEF DESCRIPTION OF THE DRAWINGS

The invention, together with further advantages thereof, may best be understood by reference to the following description taken in conjunction with the accompanying drawings.

FIG. 7 shows an exemplary virus structure and associated anti-virus structure in accordance with an embodiment of the invention.

FIG. 19 shows a system block diagram of a computer system used to execute functions of the present invention including the scanning, deletion, truncation, and quarantine of data packets suspected of harboring computer viruses, worms etc.

DETAILED DESCRIPTION OF THE INVENTION

Figure 1:
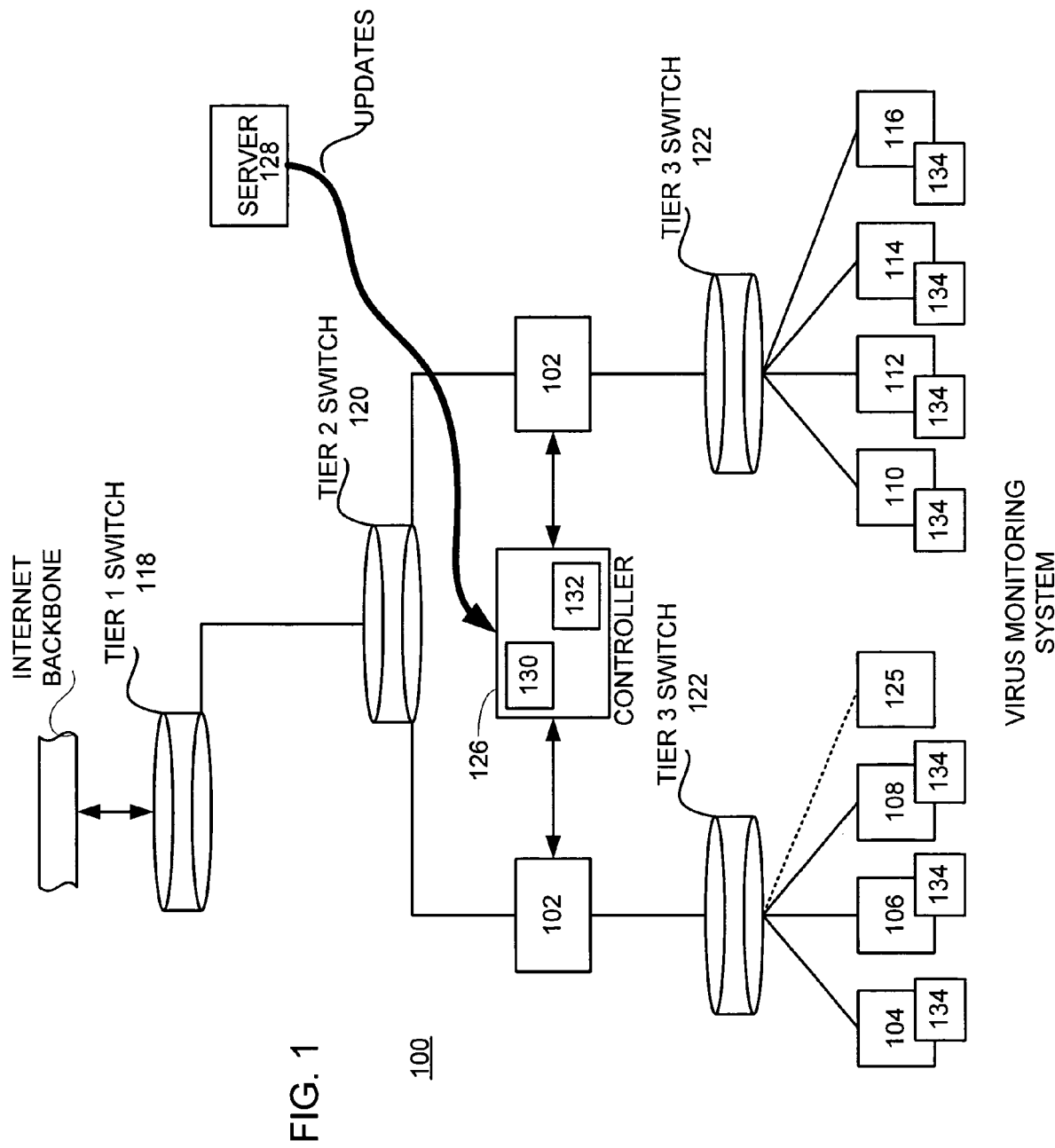
FIG. 1 shows a distributed network having a network virus monitor in accordance with an embodiment of the invention.

Reference will now be made in detail to a preferred embodiment of the invention. An example of the preferred embodiment is illustrated in the accompanying drawings. While the invention will be described in conjunction with a specific embodiment, it will be understood that it is not intended to limit the invention to that particular embodiment. To the contrary, it is intended to cover alternatives, modifications, and equivalents as may be included within the spirit and scope of the invention as defined by the appended claims.

At the network level, conventional anti-virus software still relies on the support system at the anti-virus service provider to generate cures. Such practice is heavily reliant on the response time at the service provider in procuring the virus sample, implementing the virus analysis, generating the appropriate cures, and deploying them to the end users. Although such systems may be effective at some levels, certain end users, (such as system administrators of corporate networks) still require solutions that provide better lead time and effectiveness in countering sudden outbreaks of computer viruses. This is particularly important as the size of networks increase and the feasibility of incorporating anti-virus software for every component in the network becomes prohibitively expensive. In addition, once a computer has violated the integrity of a network, it is extremely difficult, time consuming, and expensive to both identify and clean the affected computers. This is particularly significant since all infected computers must be identified, cleaned, and inoculated against future infections.

Accordingly, the invention describes a network level virus monitoring system capable of monitoring a flow of network traffic in any of a number of inspection modes depending upon the particular needs of a system administrator. The monitoring provides an early warning of a virus attack thereby facilitating quarantine procedures directed at containing a virus outbreak. By providing such an early warning, the network virus monitor reduces the number of computers ultimately affected by the virus attack resulting in a concomitant reduction in both the cost of repair to the system and the amount of downtime. In this way, the inventive network virus monitor provides a great improvement in system uptime and reduction in system losses.

In one embodiment of the invention, the monitoring system includes a virus monitoring device coupled to a distributed network of a number of interconnected computing devices. In the described embodiment, the virus monitoring device includes a virus monitor arranged to detect a network computer virus in a flow of traffic in the network. The monitoring devices also includes a network computer virus outbreak warning unit coupled to the network monitor arranged to provide an early warning of the network computer virus. A network computer virus warning response unit responsive to the network computer virus outbreak warning unit is arranged to isolate a network segment affected by the network computer virus, or to block the network computer virus.

The invention will now be described in the context of a network of interconnected client devices. Such client devices can include desktop computers, laptop computers, thin client devices such as personal digital assistants (or PDAs), embedded appliances, and so on. Although described using a network of interconnected computers and computing devices, the scope and intent of the invention extends to all those devices for which viruses and/or worms find worthy of attack. Furthermore, for sake of this discussion only, the interconnected devices communicate with each other by way of a packet based communication protocol. Such protocols include TCP (Transmission Control Protocol)/IP (Internet Protocol) which is well known in the art. TCP is a set of rules used along with the IP to send data in the form of message units between computers over the Internet. While IP takes care of handling the actual delivery of the data, TCP takes care of keeping track of the individual units of data (called packets) that a message is divided into for efficient routing through the Internet.

For example, when an Hyper Text Transfer Protocol (HTTP) file is sent from a Web server, the Transmission Control Protocol (TCP) program layer in that server divides the file into one or more packets, numbers the packets, and then forwards them individually to the IP program layer. Although each packet has the same destination IP address, it may get routed differently through the network. At the other end at the client computer, the TCP layer reassembles the individual packets and waits until they have arrived to forward them as a single file. It should be noted, however, that the invention is well suited for use with other communication protocols such as SMTP etc.

Accordingly, FIG. 1 shows a virus monitoring system implemented on a distributed network 100 having a network virus monitor 102 in accordance with an embodiment of the invention. As shown, network 100 is a distributed computing environment that includes a number of individual client devices 104-116. The client devices can take the form of any computing device having on-board memory susceptible to attack by a computer virus or worm. Such devices include but are not limited to computers (both desktop and laptop), and hand held thin client devices such as personal digital assistants (or PDAs).

Generally, a network is divided into a hierarchy using a geographical classification, a management classification and detailed information. The hierarchy is accordingly displayed in the form of a map having a number of levels. Accordingly, network 100 is structured along the lines of a tiered network architecture with a hierarchy of three tiers. In this particular architecture, various multi-service switches are used to provision subscriber services at the first tier of the network (i.e., the Internet backbone, for example).

A tier 1 switch (shown as switch 118) can be used to consolidate traffic from many subscribers and may also may perform traffic shaping, depending on the network architecture. In some cases, the tier 1 switch 118 then can be connected to a tier 2 switch 120 which, in turn, is connected to a tier 3 switch 122, thereby providing further traffic concentration. In this way, the tiered architecture provides a modular way of extending the network's scalability, enabling the carrier to add switching capacity to the network topology as subscriber demand requires. Accordingly, network 100 is described in terms of a multiple-layer network, including a first tier, second tier, third tier, etc. For example, the client devices 104-116 form a lowest level tier (i.e., the third level) while the virus monitors 102 form a next higher order tier (i.e., the second level) and so on.

In addition to providing scalability, the tiered architecture of network 100 provides for topologically advantageous positioning of the network virus monitor 102. For example, in the instant case, virus monitor 102 is placed between the tier 2 switch 120 and the lower level tier 3 switch 122 to which the various client devices 104-116 are coupled. In this way, all network traffic between the tier 2 switch (which may be coupled directly to the Internet backbone, for example) and any of the tier 3 switches can be monitored by the virus monitors 102 at a point prior to any of the client devices. By providing a bulwark against a potential virus attack, the virus monitors 102 provide a focal point for virus detection, virus outbreak prevention, and, if needed, virus outbreak cleanup and restoration that, in turn, effectively protect the various client devices from the attacking virus. It should be noted, that a docking port 125 can be included in network 100 arranged to accept temporary, or visitor, client devices.

In the described embodiment, each of the virus monitors 102 is coupled to a controller 126 that is, in turn, coupled to a server computer 128 (or a number of server computers) each of which can be configured as a stand alone server computer having various user interfacing devices, such as monitor, keyboard and mouse described in some detail below. In the described embodiment, the server computer 128 is a network-connectible computer or a server device, such as a workstation running an UNIX operating system, or a computer running the WindowsNT™ or WindowsXP™ operating system. The controller 126 includes a rules engine 130 used to store and source a plurality of detection rules for detecting computer viruses and an outbreak prevention policy (OPP) distribution and execution engine 132 that provides a set of anti-virus policies, protocols, and procedures suitable for use by a system administrator for both preventing viral outbreaks and repairing any subsequent damage caused by a viral outbreak. It should be noted that the detection rules, policies, and procedures manifest in the rules engine 130 and in the OPP distribution and execution engine 132 can be periodically updated by way of the server computer 128 as needed.

Moreover, the controller 126 (that in some cases may be located in a separate location) also serves to determine whether the abnormal events observed by the various monitors 102 are potentially computer viruses based, in part, upon statistical results of the observed abnormal events. In addition, the server 128 can provide virus cleaning agents derived from and based upon those viruses both known and unknown but subsequently analyzed. In this way, even those situations where a previously unknown viral agent attacks various components of network 100, the viral analysis provided by the server 128 can facilitate both quarantine operations (by way of network segmentation protocols) and subsequent viral clean up (by way of viral cleaning agents) and repair (by way of virus repair agents). In addition to providing palliative, or remedial, services, the server 128 is also capable of providing a viral inoculation agent used to prevent future attacks on either those computers affected (and subsequently cleaned) and those computers unaffected but vulnerable to future attack by the viral agent. In the described embodiment, some of the client devices may also include a client rules set (CRS) 134 that stores rule information and parameters for detecting computer viruses. It should be noted that the rule information and parameters for detecting computer viruses stored in the CRS 134 can be preinstalled in each device, or if not present, can be downloaded to that particular client by the server 128 either directly or by way of the controller 126 and/or virus monitor 102.

During an installation phase (or an initialization phase), each of the virus monitors 102 self register by collecting certain environment information (such as the IP address of all relevant client devices) as well as self configuration within network 100 by, for example, determining an appropriate IP address for virus monitor 102, itself. In addition to self registering, virus monitor 102 will search for an appropriate controller 126 (such as a nearest controller, for example) and once found, will register with it accordingly.

Figure 2:
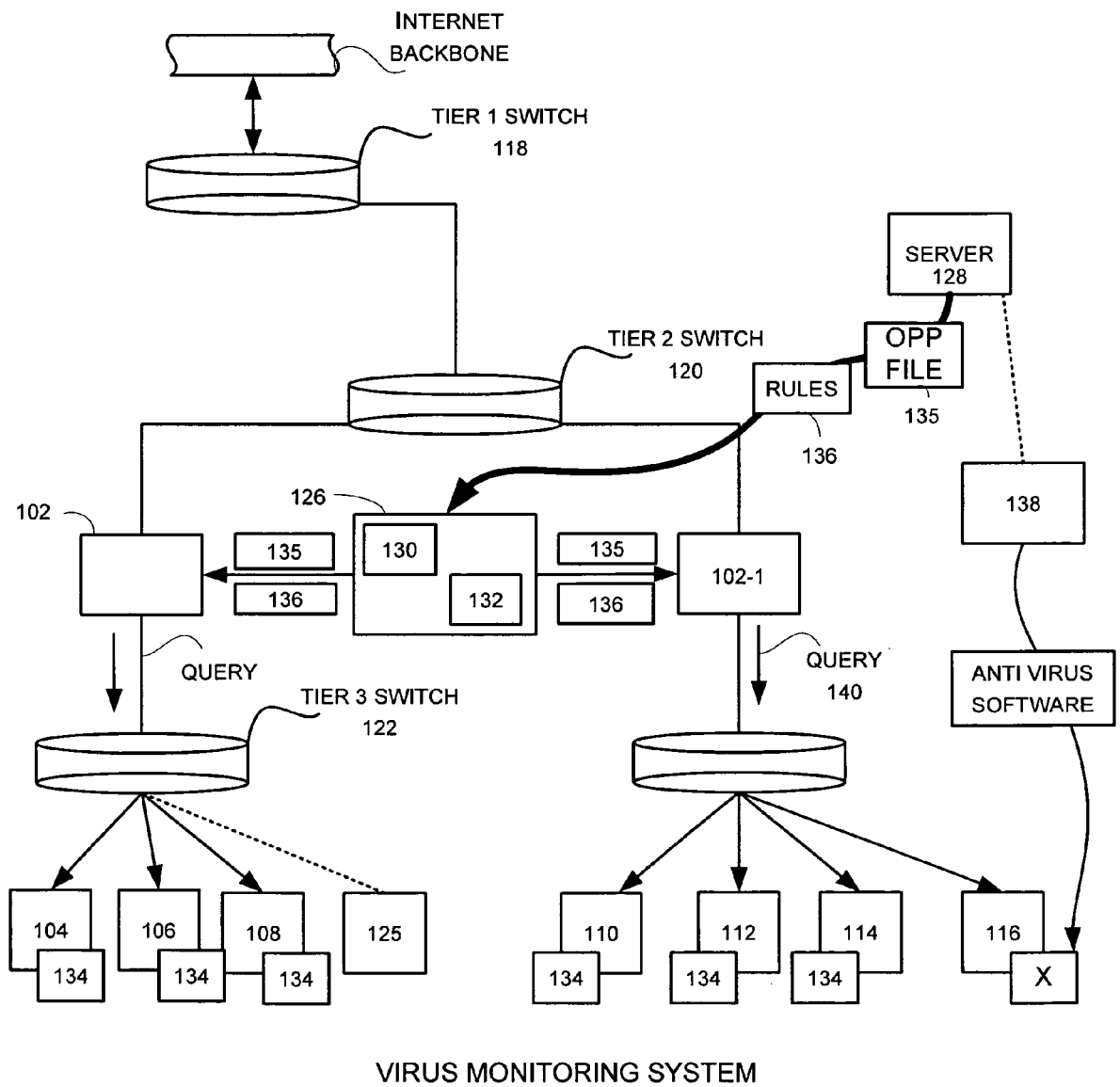
FIG. 2 is the distributed network of FIG. 1 having an active network virus monitor.

Referring specifically to FIG. 2, once virus monitor 102 has completed the installation and/or registration process, the controller 126 receives an updated OPP file 135 of the most current set of policies and procedures and rules set 136 of the most current virus detection rules from the server 128 (if needed). Once received by the controller 126, the OPP file 135 and the rules set 136 are forwarded to each of the virus monitors 102 in order to provide the latest rules and virus filters and patterns as deemed appropriate. For example, the OPP file 135 is used by the OPP distribution and execution engine 132 to apply appropriate virus policies (such as particular file types to scan for viruses), while the rules set 136 is used by the rules engine 130 to practice specific virus detection rules. It should be noted that the various monitors, controllers, and servers can be configured in any operating platform. For example, such platforms include embedded Linux, PC based Linux or Windows (as above) and in some cases when higher level resources are required, Sun SPARC™ platforms and the like can be used.

Once the various virus monitors 102 have been updated with the most current rules and policies, virus monitor 102 will perform an anti-virus security policy enforcement procedure whereby each of the client devices coupled to virus monitor 102 is queried in order to determine if that client device has the appropriate and proper anti-virus software installed. Such appropriate anti-virus software can include any recognized anti-virus software from any number of recognized vendors such as Trend Micro of Cupertino, Calif., and the like. It should be noted, however, that any time a new client device is coupled to virus monitor 102, the newly connected client device will also be queried in a similar manner.

In those situations where a client device is found to not have the appropriate anti-virus software installed, virus monitor 102 has any number of options for response. In most cases, virus monitor 102 will direct the target client device (i.e., the client device found to not have the appropriate anti-virus software) to an anti-virus installation server 138 (which may actually be the server 128) and block any traffic to/from the target client device and all other addresses until such time as the appropriate anti-virus software has been properly installed.

For example, virus monitor 102-1 sends a query 140 to each of the client devices 110-116 requesting confirmation that each has installed therein the appropriate anti-virus software as determined by the policies contained in the OPP file 135. Upon receiving the query 140, each of the client devices checks for confirmation that the appropriate anti-virus software is indeed present. If, say in the case of the client device 116, that it is determined that either no software is present or the installed software is not appropriate (based upon the policies in the OPP file 135, for example), the client device 116 is directed only to the anti-virus software installation server 138 and no other. At this point, optionally, a user interface can be displayed on the client device 116 indicating that until such time as the proper software has been installed, that the client device 116 will be prevented from communication with other systems. It should be noted, however, that some transmission protocols (such as HTTPS) that are essentially immune from viral infections due to the encryption thereof could be used).

Once the appropriate anti-virus software has been installed in the client device 116, virus monitor 102-1 relinquishes the lock on the communication channels for the client device 116. In this way, the client device 116 can communicate with the other devices of network 100.

In those situations where a temporary user wishes to connect into network 100, a determination must be made whether or not the visitor client device is compliant with the current policies and rules. Typically, it is not advisable to grant a temporary user a license to use the anti-virus software since that would be both costly and limit the number of available licenses for other users. From the standpoint of the visitor, installing anti-virus software for only a limited time is also not desirable since the software could possibly interfere with anti-virus software already present on the computer and/or require computing resources that are not readily available. Therefore, in those situations where a visitor client device is to be connected to the network another approach is required.

Figure 3:
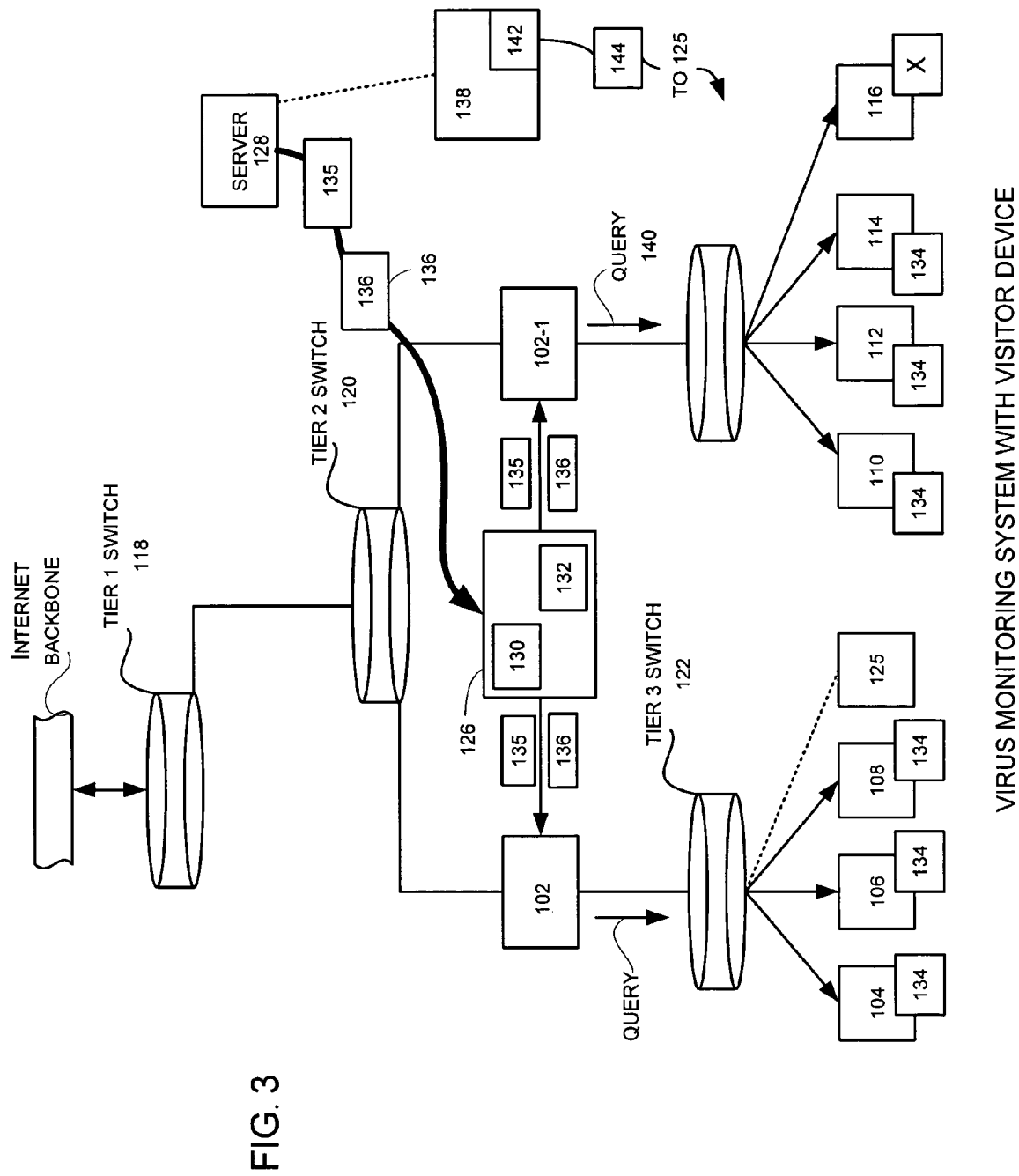
FIG. 3 shows the distributed network of FIG. 1 whereby the network virus monitor is registering all connected client devices.

Specifically, in a particular embodiment of the invention, when a visitor connects a heretofore unknown (to network 100) client device 125 as shown in FIG. 3, virus monitor 102 will query the visitor client device 125 for the presence of appropriate anti-virus software. If it is determined that the visitor client device 125 does not have the appropriate anti-virus software installed, then access to all addresses other than an anti-virus software installation server 138 are blocked until a scan is made of the memory of the visitor client device 125 by a virus scan server module 142 (which may or may not be part of the anti-virus software installation server 138).

Once the visitor client device 125 has been deemed to be free of computer viruses, the virus scan server 142 passes a use token 144 to the visitor client device 125. The use token 144 is typically valid for a limited amount of time (an hour, for example) after which the token must be re-validated. However, during the period of time that the use token 144 is valid, all channels to/from the visitor client device 125 are open and available for the passage of network traffic. In order to re-validate the use token 144, the visitor computer 125 must request a new token which will be granted based, in part, upon a determination that the visitor client device 125 has remained free of computer viruses (or worms).

At this point, all client devices (including any visitor client devices) have been confirmed to either have the appropriate anti-virus software (or have a valid use token) and virus monitor 102 is ready to begin monitoring network traffic for the presence of computer viruses (and/or worms).

In general, virus monitor 102 monitors activities of network 100 for abnormal events according to both the policies and rules and generates abnormal report if abnormal events are detected which are then transferred to the controller 126. In some embodiments, the controller 126 determines an alert level for the detected abnormal events while in other embodiments, the controller 126 forwards the abnormal events information to the server 128 which will evaluate the data and if determined to be appropriate will send an early virus warning to other virus monitors in network 100. In some cases, the abnormal reports data is forwarded to a virus attack warning server that decides a course of action to take in order to prevent a spread of the virus. Such courses of action include whether or not to quarantine affected segments of network 100, generate and distribute a virus cleaning agent to the affected segment, inoculate other computers in the network to prevent the spread of the virus, and finally, if possible, repair any damage caused by the virus outbreak.

In order to protect network 100, the virus monitors 102 continuously monitor network traffic for potential viral attacks. One of the prime considerations of any network is the available bandwidth in that anything that unnecessarily restricts the bandwidth (i.e., the unimpeded flow of network traffic) must be avoided if at all possible. Therefore, in order to minimize the impact on the flow of network traffic (and therefore preserve bandwidth), the virus monitors 102 are initially set to run in what is referred to as stand-by mode. By stand-by mode it is meant that essentially all data packets are allowed to continue to flow in network 100 with the caveat that virus monitor 102 will use a copy of the packet in order to determine whether or not there is a virus present.

Figure 4:
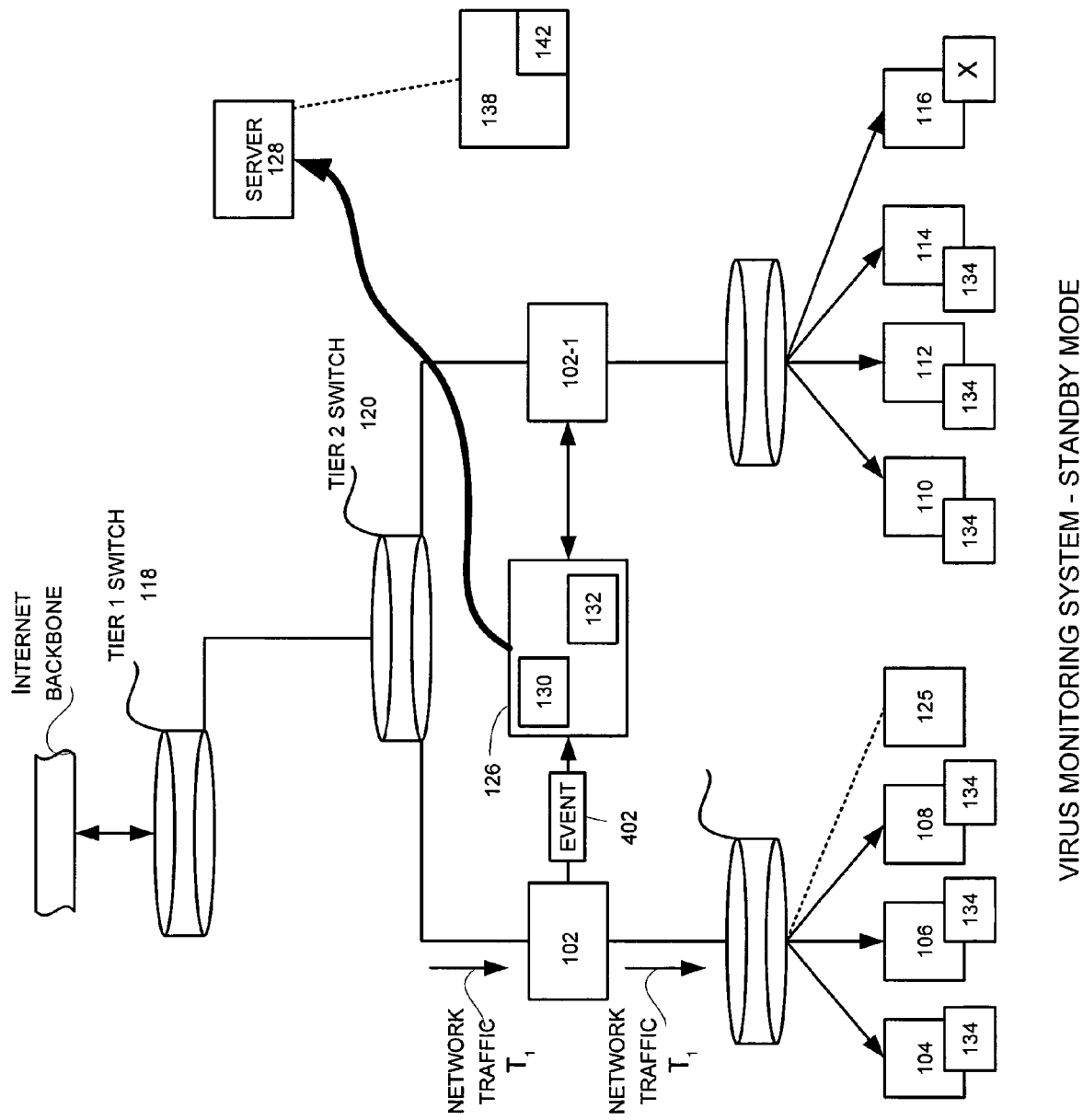
FIG. 4 shows the distributed network of FIG. 3 whereby the network monitor is operating in standby mode and has flagged a virus event.

Referring to FIG. 4, virus monitor 102 is monitoring the flow of data packets that constitute the network traffic flow (represented as the network traffic flow T1) in standby mode. In this way, the bandwidth of network 100 is minimally affected since the network traffic flow remains substantially constant both before and after virus monitor 102. This preservation of network bandwidth is accomplished by the fact that virus monitor 102 monitors the network traffic (i.e., the constituent data packets) by copying all of the data packets and using the copied data packet for its analysis. In this way, there is effectively no loss of data packets due to the actions of virus monitor 102. In some embodiments, a determination is made of the data packet type, and based upon the packet type, only those packet types deemed vulnerable to virus attack are copied. In this way, the resources required to perform the virus monitoring is limited to only that required to adequately monitor the traffic flow.

In the case where virus monitor 102 has detected a possible virus in one or more of the data packets (or in the case where a potential intruder attack is underway), virus monitor 102 generates an event flag. This event flag provides information based upon the detected virus using both the rules set 136 and the OPP file 135 as well as any other data deemed useful. Typically, the event flag is passed directly to the controller 126 which may, in some cases, forward the event flag to the server 138 for further analysis and/or disposition of any remedial actions, if any. This collaborative nature of the inventive virus monitoring system is well documented and described in co-pending U.S. patent application Ser. No. 10/411,665, entitled, "MULTILEVEL VIRUS OUTBREAK ALERT BASED ON COLLABORATIVE BEHAVIOR" by Liang et at filed Apr. 10, 2003 which is incorporated by reference herein in its entirety for all purposes.

Figure 5:
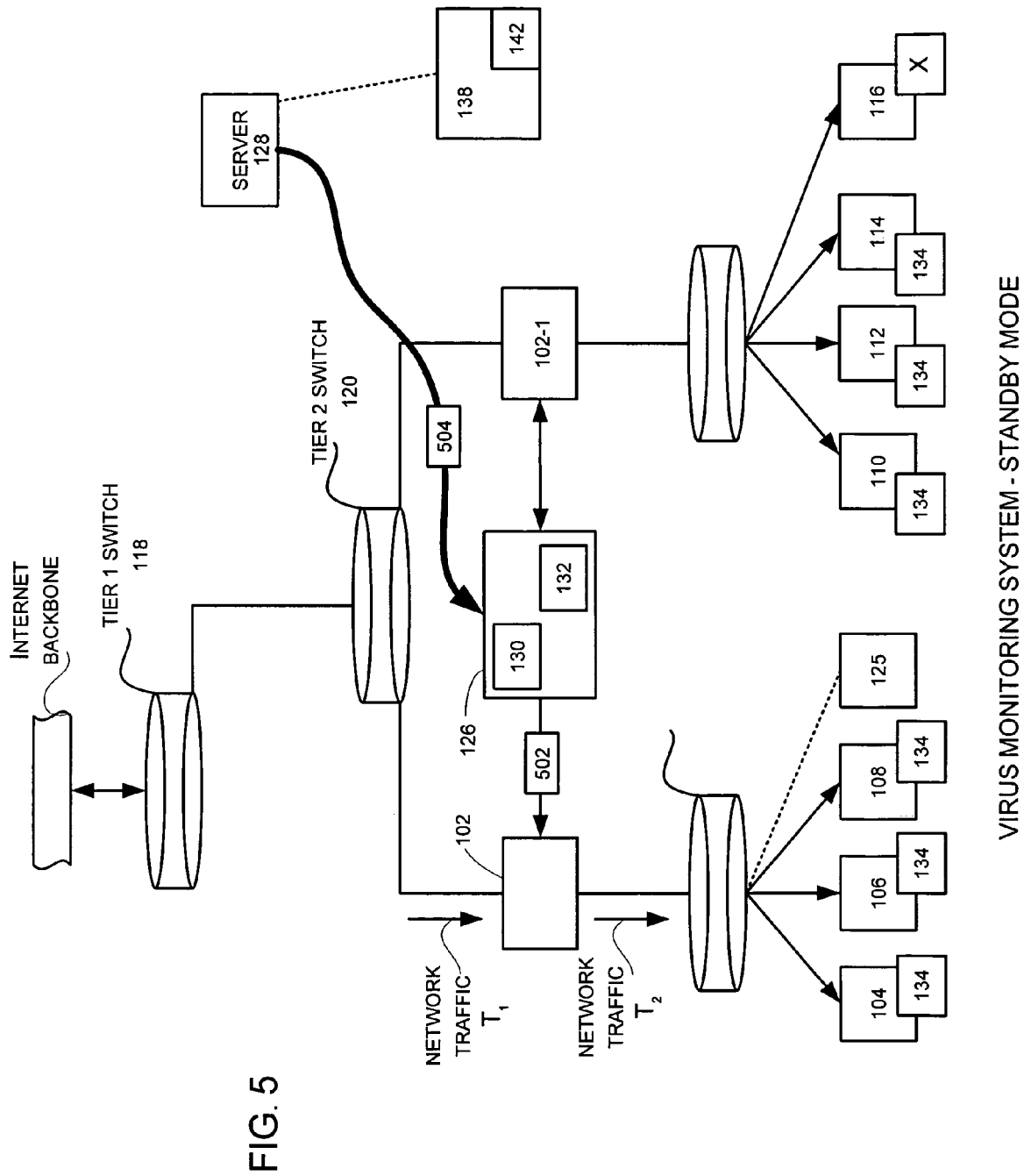
FIG. 5 shows the distributed network of FIG. 2 whereby the network virus monitor is operating in inline mode.

In some cases, the event flag represents a potential threat so severe that the operation mode of virus monitor 102 is immediately changed from the standby mode to what is referred to as the inline mode without intervention from the controller 126 as shown in FIG. 5. In the inline mode, all data packets in the traffic flow T1 are analyzed without copying such that those data packets determined to be (or suspected of being) infected are not allowed to pass back into the traffic flow (in this case T1 is greater than T2). In this the virus is blocked from passing to and throughout network 100. In other instances where the event itself does not trigger virus monitor 102 to change operations mode to the inline mode, a mode change command 502 from the controller 126 or a mode change command 504 from the server 128 is used to trigger the mode change. In this way, the inventive anti-virus system has the added advantage of delegating authority to the virus monitors in those situations where speed is of the essence to contain a potential viral outbreak. On the other hand, in those cases where the threat is less clear, or further analysis is required, the onus of determining the threat potential and execution of a defense plan can be focused in higher level analysis engines (such as a system administrator, for example) thereby reducing false alarms and unnecessary system shutdowns.

It should be noted, that although not explicitly shown in the various figures, the number of virus monitors can be as large a number as necessary to adequately monitor the traffic flow. Therefore, in the case of a nascent virus attack, it is very desirable to determine as quickly as possible both the extent of the virus attack and the probability of the attack becoming a general virus outbreak that threatens the integrity of the entire network 100.

Therefore, each of the virus monitors 102 that have detected a virus or viruses in the associated traffic flow will dispatch a corresponding event report to the associated controller 126. The various controllers, in turn, will forward the various event reports to the server 128 where they will be collated and analyzed in order to determine if a virus warning 506 should be generated. In the case where a virus warning is generated, the virus warning 506 is dispatched to those controllers 126 that the server 128 has determined to be most likely affected by the virus outbreak. In this way, any system administrator(s) can review the current state of network 100 and be apprised of the potential threat for the system as a whole or for selected segments as might be considered important.

Figure 6A:
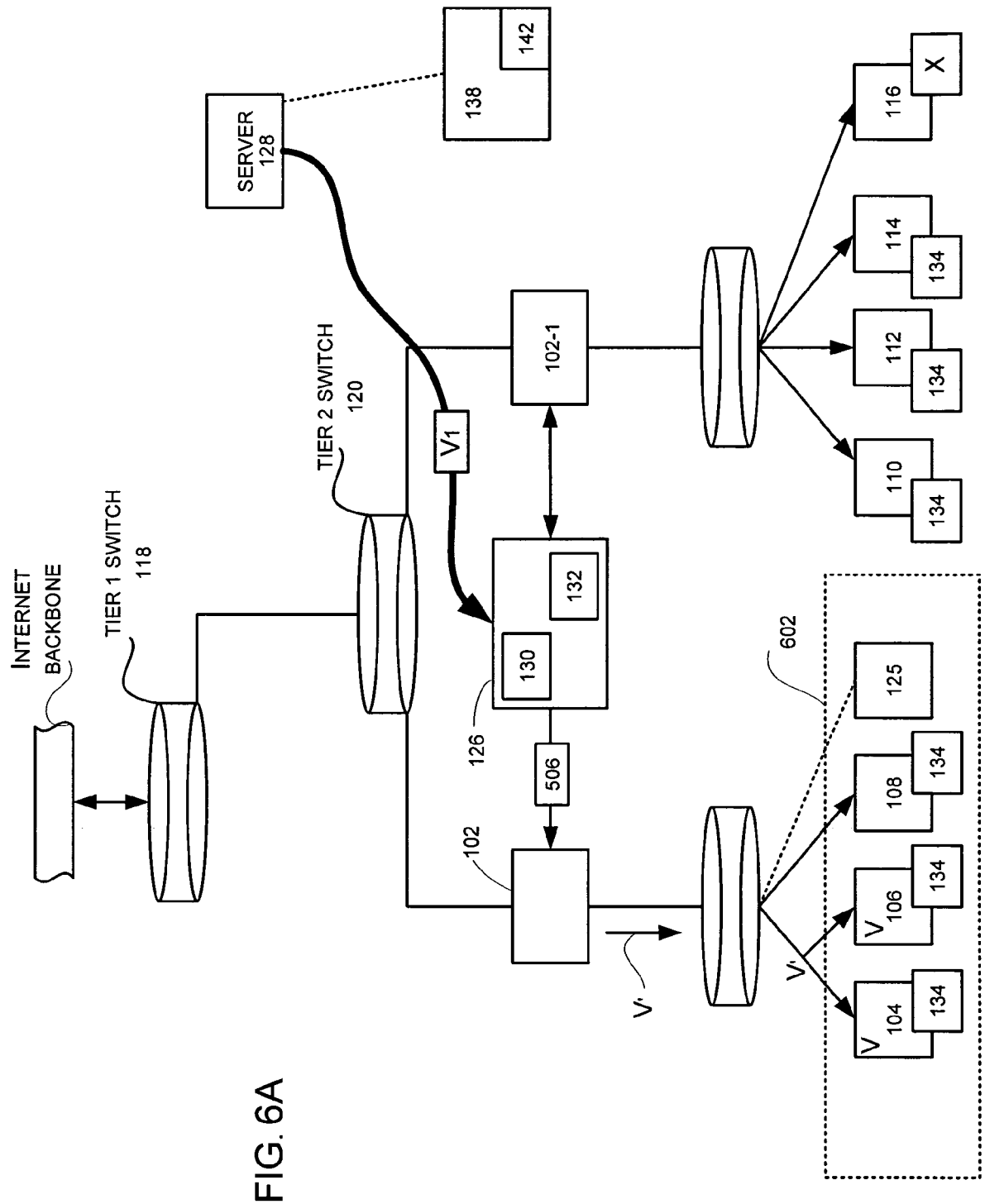
FIGS. 6A-6B shows an exemplary distributed network having a segmented portion thereof due to a virus outbreak and virus clean procedure in accordance with an embodiment of the invention.

Once a determination has been completed that a virus outbreak is in progress, the server 128 (or in some cases, one or more of the controllers 126) will institute an attempt to contain the virus outbreak using a number of tools. One such tool is referred to as network segment isolation, which as the name suggests, physically isolates those segments of network 100 deemed to be affected by the virus from those segments deemed to be most likely unaffected but potentially threatened by the virus. For example, in FIG. 6A, the controller 102 (as directed by the server 128 in this example) has instituted a network segment isolation protocol whereby a segment of the network 602 has been isolated from the rest of network 100. The segment 602 includes all client devices 104-125 (including any visitor devices that may happen to be connected to network 100 at that time). Once isolated, all traffic from the affected client devices can no longer flow freely throughout the network in order to contain the virus. Once a number of client devices have been identified as most likely to be compromised by a virus V, (such as client devices 104 and 106 in this example), the affected client devices and restricted in such a way that each of the affected client devices are blocked from communication with even those clients devices in the affected network segment. For example, the affected client devices 104 and 106 can only communicate between each other and not the other client devices 108 and 125 in the network segment 602.

Once the affected computers have been identified, a virus cleaning agent will be identified that when used has the effect of both cleaning the affected computers, inoculating the cleaned computers from subsequent infections, and inoculating unaffected, but threatened computers, from infection of the virus.

There are at least two components to every virus and more likely three components. FIG. 7 illustrates a representative computer virus structure 700. Typically, the virus structure 700 includes a detection module, an infection module, and a payload that is an action it performs on the infected computer. The payload represents those actions that the virus carries out separately from replication. Payloads can vary from the annoying (for example, the WM97/Class-D virus, which repeatedly displays messages such as "I think 'username' is a big stupid jerk"), to the disastrous (for example, the CIH virus, which attempts to overwrite the Flash BIOS, which can cause irreparable damage to certain machines).

However, before a payload has the chance to inflict any damage, the computer virus must be introduced into the computer. This action is accomplished by the actions of the detection module 702 and the infection module 704. The detection module 702 determines if a particular computer has already been infected by the virus V. If not, then the virus V is introduced into the appropriate portion of the computer where the infection (or sometimes referred to as the replication module or portion) takes over to replicate the virus V as often as possible. Once the virus V has been successfully introduced and replicated, each virus instance will execute its associated payload portion 706 to the detriment of the computer system However, according to one embodiment of the invention, an anti-virus agent 710 can be developed using the virus structure 700 that has the effect of cleaning affected computers, inoculating those computers (and others) from subsequent infection, and if necessary, repairing any damage caused by an executed virus payload portion 706. In order to accomplish these goals, the anti-virus structure V1 uses a modified (albeit recognizable from the standpoint of the virus V) virus structure 710. For example, the anti-viral detection module 712 still identifies those computers affected by the virus V but unlike the virus detection module 702, the anti-virus detection module 712 continues the infection process by introducing the anti-virus infection module 714. In this way, the original virus V is overwritten by the anti-virus V1 thereby setting the stage of eventual clean up and repair. Once the anti-virus V1 is introduced, an anti-virus V1 payload portion 716 repairs any damage caused by the original virus V. It should be noted, that the derivation of the anti-virus V1 is directly related to the structure of the original virus V (much like an antibody related to an associated biological virus) and therefore is effective against a particular virus, class, or group of viruses.

Returning out attention to FIG. 6A, once the affected client devices have been identified and isolated, the server 128 releases and directs the anti-virus agent V1 to the affected computers (which in this example are client devices 104 and 106). The anti-virus agent V1 proceeds to identify all computers in the network segment 602 and begins to systematically "infect" all computers in the network segment 602. For the infected client devices 104 and 106, the detection module 712 of the anti-virus V1 ignores the fact that each device is already infected with the computer virus V and proceeds to "infect" these devices with the anti-virus agent V1. The anti-virus V1 then proceeds to overwrite the original virus V in the computers 104 and 106 and executes the repair payload portion 716. The effects of the repair payload 716 again depends upon the specific damage caused by the original virus V and therefore is specifically linked to the virus V and any related viruses. But in any case, the cleaned and repaired computer is then inoculated by the anti-virus V1 in such as way that no subsequent infection by the virus V or related viruses is likely.

For those computers uninfected by the virus V, the anti-virus agent V1 is used to inoculate (or "lock the door" so to speak) those computers against subsequent infection by the computer virus V. Once it has been determined that all computers in the network segment 602 have been either cleaned, repaired and inoculated or merely inoculated, the quarantine of the network segment 602 (and more importantly the formerly infected with the computer virus V client devices 104 and 106) is ended. At some point, however, a decision is made whether or not to inoculate all the client devices in network 100 against the virus V. The decision must take into account the virulence of the computer virus V, the effects of the computer virus V, and any potential for disruption of network 100 caused, at least in part, by the inoculation process. This decision can be made at the system administrator level, or in some cases, can be based upon criteria set in the OPP.

Figure 6B:
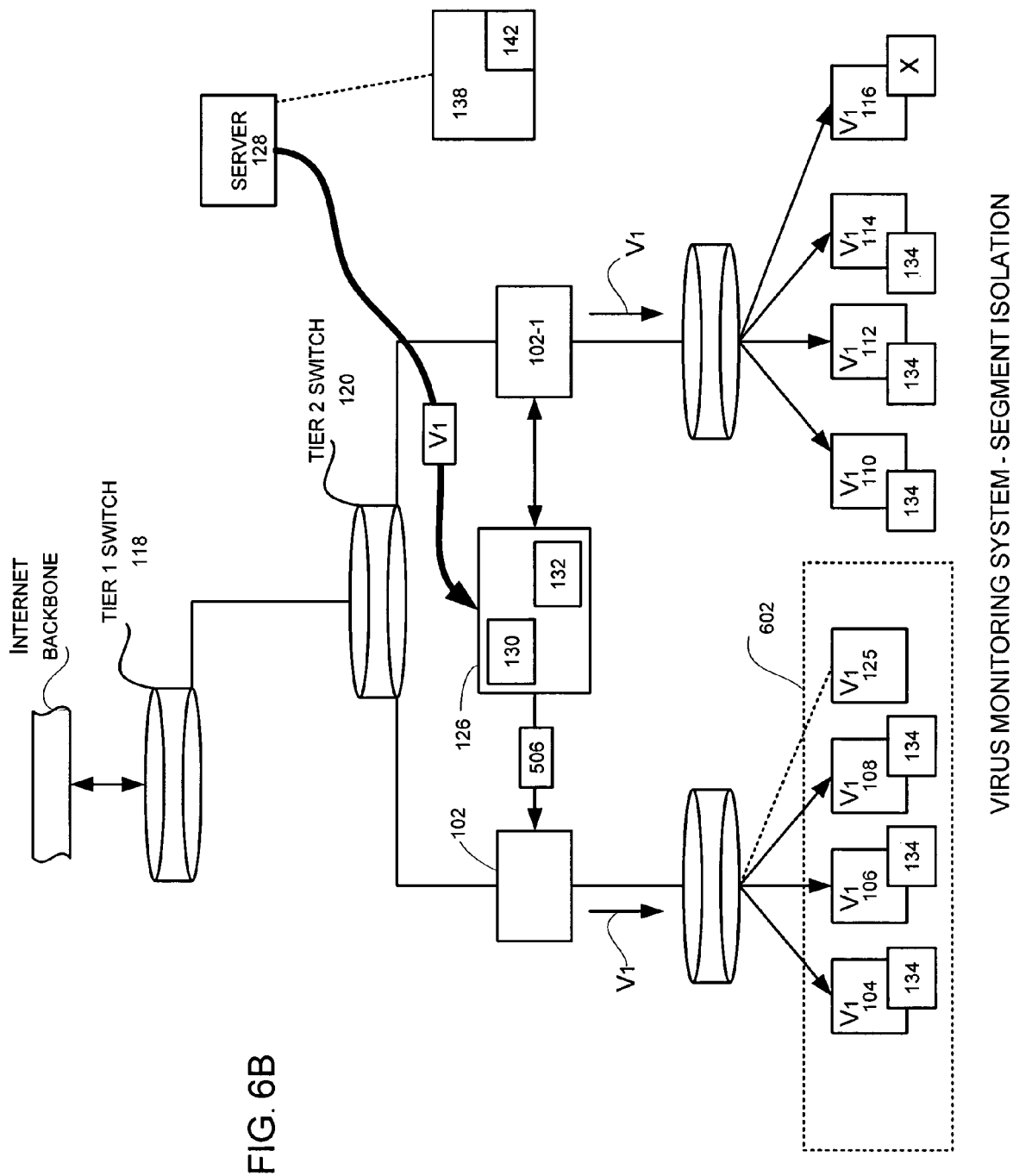

For example, referring to FIG. 6b, shows the anti-virus agent V1 being directed at a number of infected client devices having been infected by the virus V (i.e., client devices 104 and 106). In addition, a number of heretofore uninfected client devices (i.e., 108, 125, and 110-114) have been inoculated by the anti-virus agent V1 against future infections by the virus V.

Virus Monitor

Turning now to specific implementations of virus monitor 102, it is well to note that the described embodiments are merely exemplary and do not limit either the scope or intent of the invention.

Figure 8:
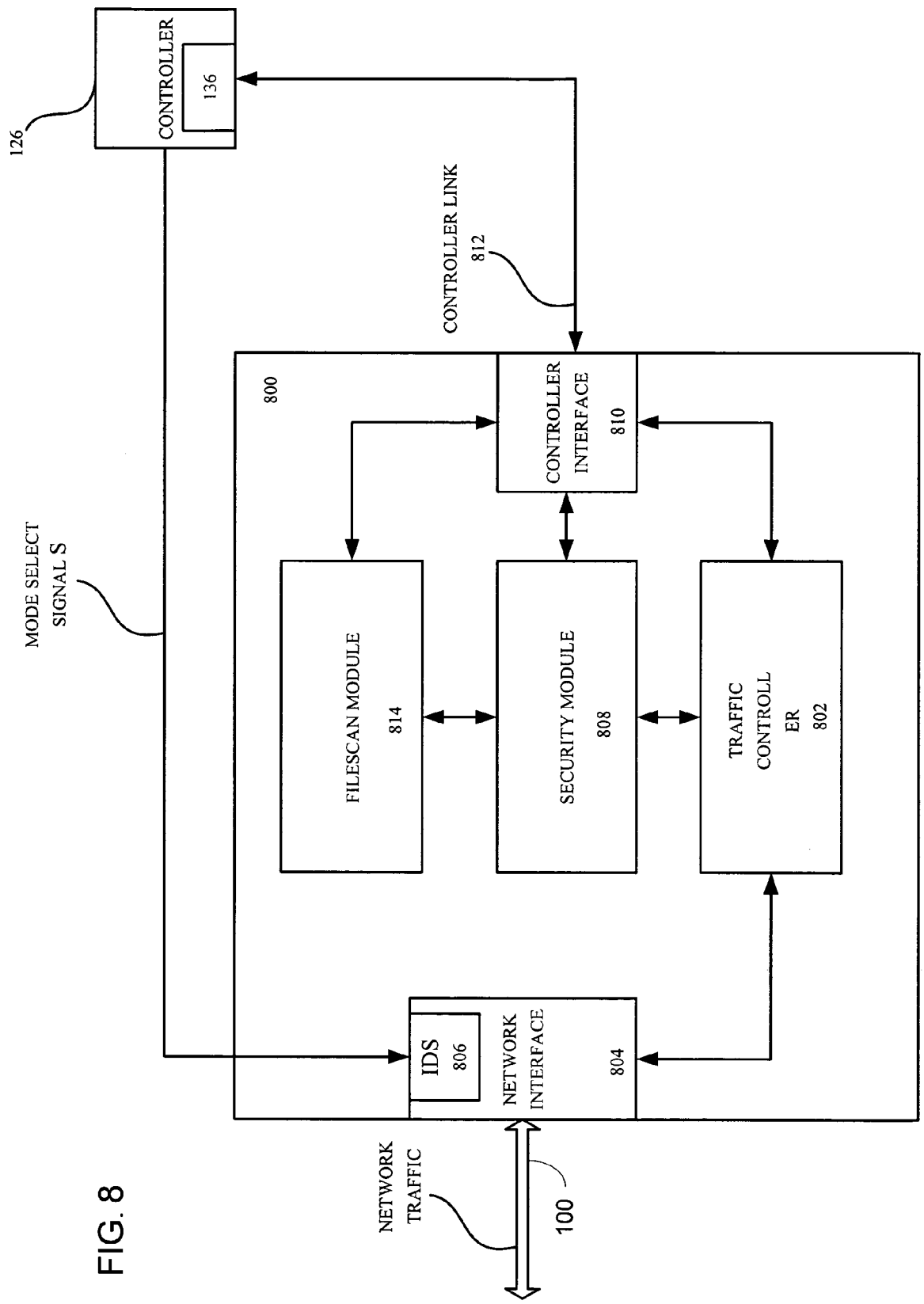
FIG. 8 illustrates an exemplary virus monitor in accordance with an embodiment of the invention.

Accordingly, FIG. 8 illustrates a virus monitor 800 as one possible implementation of virus monitor 102. Accordingly, the virus monitor 800 includes a traffic controller 802 coupled to network 100 by way of a network interface 804 that includes an intruder detection system (IDS) module 806 for evaluation of potential intruder attacks described in co-pending U.S. patent application Ser. No. 10/411,665, entitled, "MULTILEVEL VIRUS OUTBREAK ALERT BASED ON COLLABORATIVE BEHAVIOR" by Liang et al filed Apr. 10, 2003 which is incorporated by reference herein in its entirety for all purposes. Such intruder based attacks include a Denial of Service (DoS) attack whereby a large number of requests are made to a particular server computer within a small period of time resulting in the attacked server computer being unable to provide access to other, legitimate, requesters. The IDS module 806 determines an associated alert level based on the volume of the data traffic flow at the virus monitor 800 in a unit time interval which is designated as being abnormal if the volume of the data traffic flow is larger than a predetermined value in a predetermined time period.

Typically, a host base IDS (not shown) sets an alert threshold very high in order to reduce the rate of false alarms in detecting viruses, which may cause inefficiencies and inflexibilities in dealing with virus outbreaks. In contrast, the collaborative anti-virus system adopts multilevel alert thresholds, with the highest alert thresholds being comparable to those of a host base IDS. Below the highest threshold, at least two lower thresholds are maintained in grouping activities at different levels of potential virus outbreak. It should be noted at this point, that in some embodiments, the traffic controller 802 can be a distributed type controller and can be located in a remote location. By remote location, it is meant that the traffic controller 802 can be implemented as discrete components each of which are in communication with each other but not within the same physical container. However, in the described embodiment, the traffic controller 802 is included as a separate component in a larger device (such as virus monitor 102) suitably disposed to monitor network 100.

Coupled to the traffic controller 802 is a security module 808 arranged to apply all relevant policies and rules (as provided by the controller 126, for example, by way of a controller interface 810 and a controller link 812). The security module 808 also provides a determination whether or not a particular data packet is of a type likely to be infected by a computer virus. For example, it is unlikely that encrypted type data packets (such as those following the HTTPS protocols) are likely to be infected by a virus and are thus not passed on for analysis by a file scan module 814.

Operationally, a data packet will be directed to the security module 808 by the traffic controller 802. The data packet can be either a copy of an original data packet when the virus monitor 800 is in the standby mode or the data packet can be the original data packet when the virus monitor is in the inline mode (both described in more detail below). Once at the security module 808, the security module 808 makes a determination whether the data packet is one most likely to be affected by a particular virus based upon a combination policies included in the OPP file 135 and the rules set 136. If the security module 808 determines that the data packet in question requires a virus scan, the data packet is passed to the file scan module 814 for further analysis. It should be noted that the file scan module 814 is used to scan any particular file for any virus and/or worm as determined by the security module 808 using those characteristics of the virus or worm known to the security module 808. At any point, any of the modules (i.e., traffic controller 802, security module 808, or the file scan module 814) can file a report in real time or as a log, or both, providing details of its operations and results. In most cases, the virus monitor 800 is operationally set in what is referred to as standby mode in response to a selection signal S.

Figure 9:
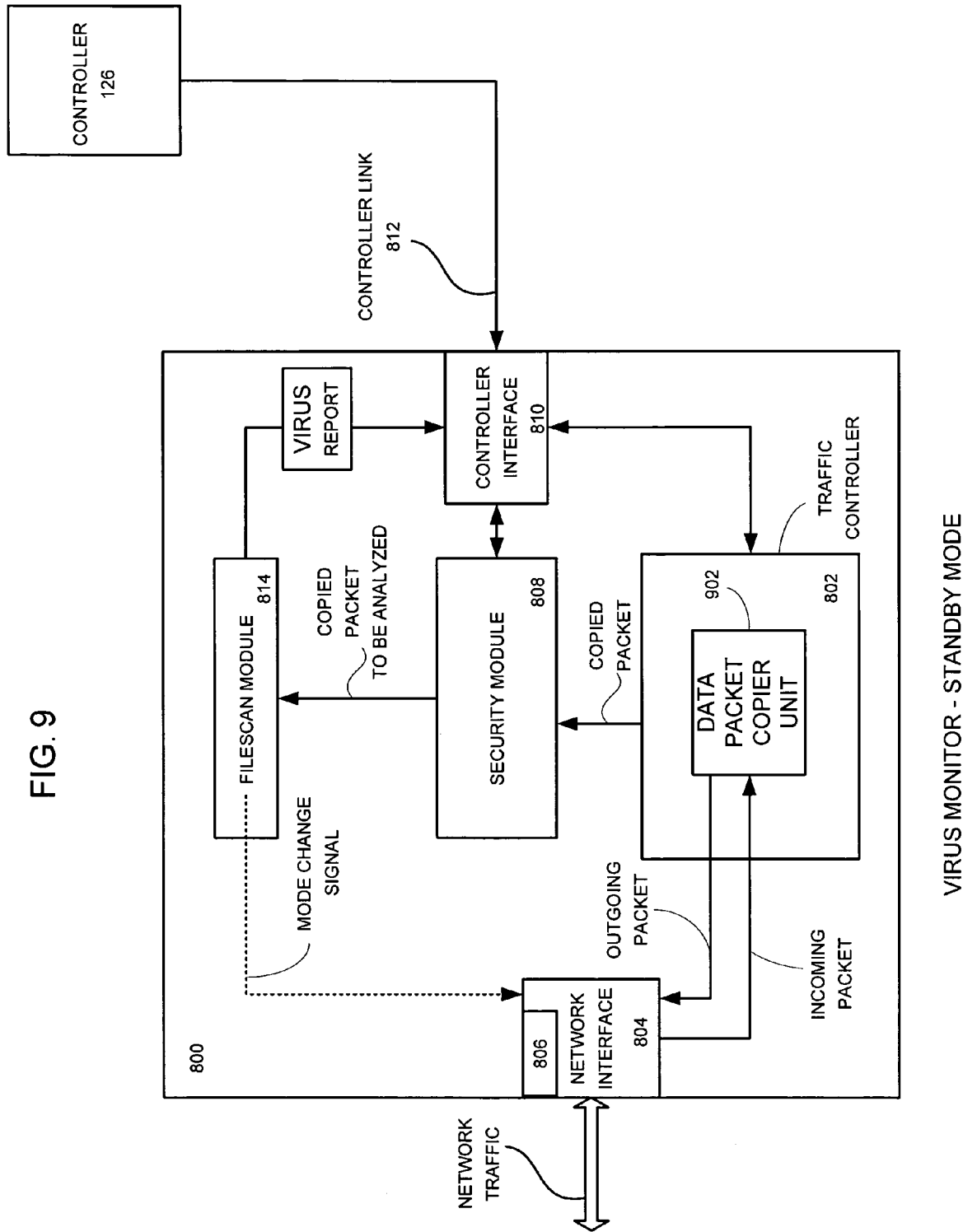
FIG. 9 illustrates the virus monitor of FIG. 8 operating in standby mode.

FIG. 9 shows a particular example of the virus monitor 800 in standby mode in accordance with an embodiment of the invention. While in standby mode, a data packet copier unit 902 included in or coupled to the traffic controller 802 copies every data packet transferred from network 100 by way of the network interface 804. It should be noted that in some implementations, a data packet type analysis is performed prior to the intended arrival at the data packet copier unit 902 at a data packet type analyzer (not shown). In some cases, if a particular data packet type is deemed unlikely to be affected by a particular computer virus, that data packet is not copied but is merely sent on its way in the network traffic flow thereby preserving computational resources for those data packets deemed more problematic.

Once the data packet in question is copied by the data packet copier unit 902, only the copied data packet is passed to the security module 808 for further analysis. It should be noted, however, that even in those situations where a copied data packet is determined to be infected with a virus, the original data packet still remains in the network traffic flow presenting a potential infection threat. It is for this reason that optionally the virus monitor 800 can be switched immediately to the inline mode internally without the need for the controller 126 to intervene based upon analysis performed by the file scan unit 814.

Figure 10:
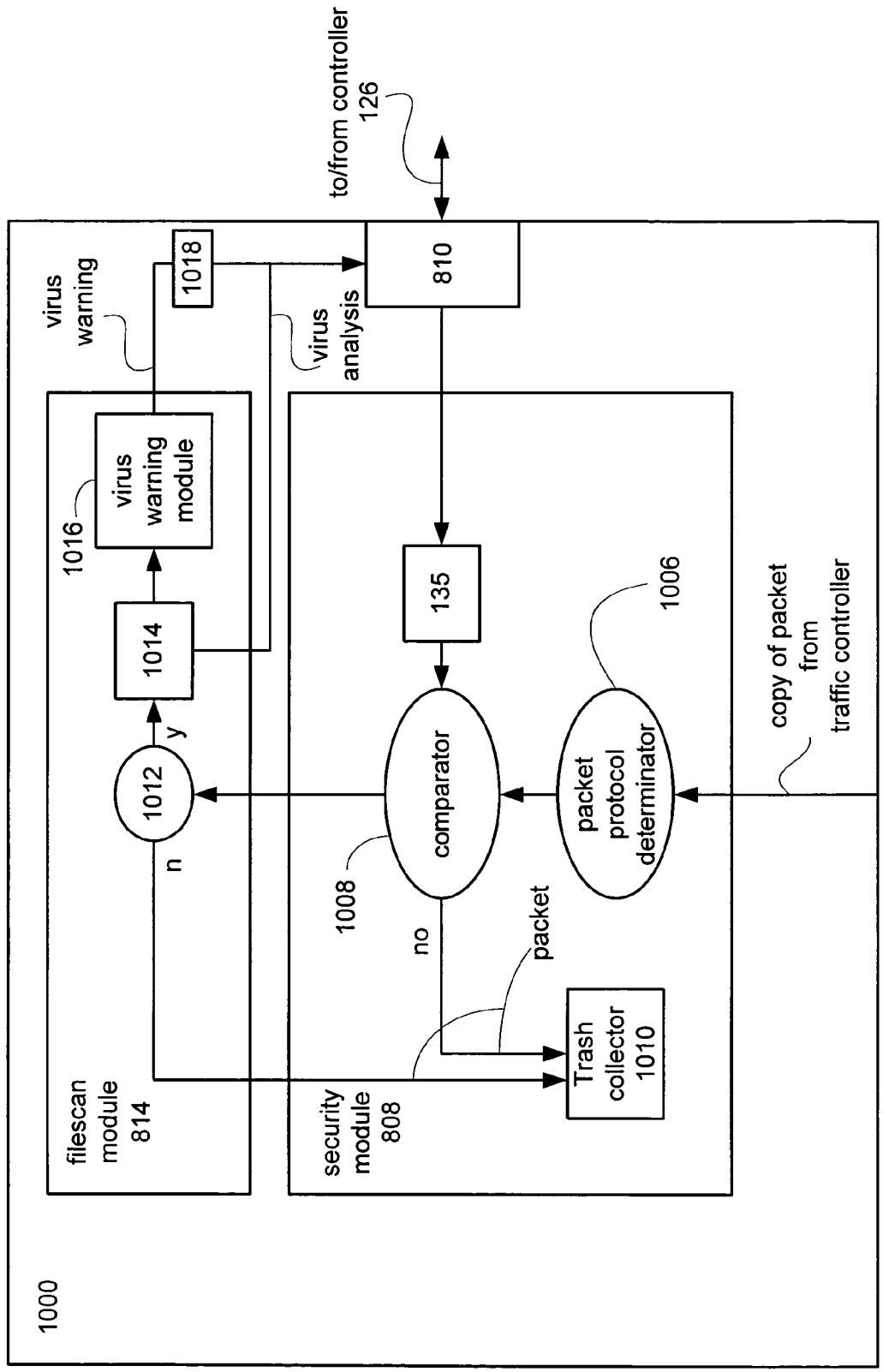
FIG. 10 illustrates an exemplary security module and file scan module of the virus monitor shown in FIG. 9 operational in standby mode.

FIG. 10 shows a portion of virus monitor 1000 that is a particular embodiment of the virus monitor 900 of FIG. 9. In the described embodiment, the security module 808 includes a packet protocol determinator 1006 arrange to receive a copied data packet from the data packet copier unit 902. It should be noted, that in some embodiments, the copied data packet can be stored in a data buffer prior to acquisition by the data packet determinator 1002. In this way, the virus monitor 900 can take advantage of any advantages due to pipelining the flow of data packets. The purpose of the packet protocol determinator 1006 is to evaluate the received data packet for the data packet protocol type. For example, the data packet protocol type can be any number of protocols, such as HTTP, HTTPS, IMAP, POP3, SMTP, etc. not all of which are susceptible to being infected by a computer virus. Therefore, once a data packet protocol type has been identified, a comparator unit 1008 determines if the data packet should be processed further by the file scan module 1004 or, in most cases, trashed at a garbage collection unit 1010. The basis for the determination is typically found in the OPP FILE 135 or rules set 136 which can be updated as needed whenever necessary.

In the case where the comparator unit 1008 has determined that the data packet should be scanned by the file scan module 1006, the data packet is passed to a virus scan unit 1012 that determines if the data packet has been infected by a virus. This determination is based upon, for example, comparing the data packet to known patterns for a particular virus or group of viruses. In the case where the data packet is found to be clean of any virus, the data packet is discarded at the garbage collection unit 1010 whereas, if the data packet is found to be infected with a virus, the virus is analyzed at a virus analyzer unit 1014. In the described embodiment, the virus analysis can includes parsing the virus into its constituent components thereby exposing a payload portion of the virus. In this way, an anti-virus agent can ultimately be produced that is useful for both cleaning and repair. Optionally, in some cases, a virus warning module 1016 sends a virus warning 1018 to the controller 126. The virus warning has the effect of notifying other monitors and their associated controllers of a potential virus attack in an attempt to thwart a potential virus outbreak. In this way, any effects of a virus outbreak can be mitigated. The analysis from the virus analyzer 1014 is, in turn, presented to the controller 126 for further collation, correlations, and collaboration by the server 128, if necessary.

Figure 11:
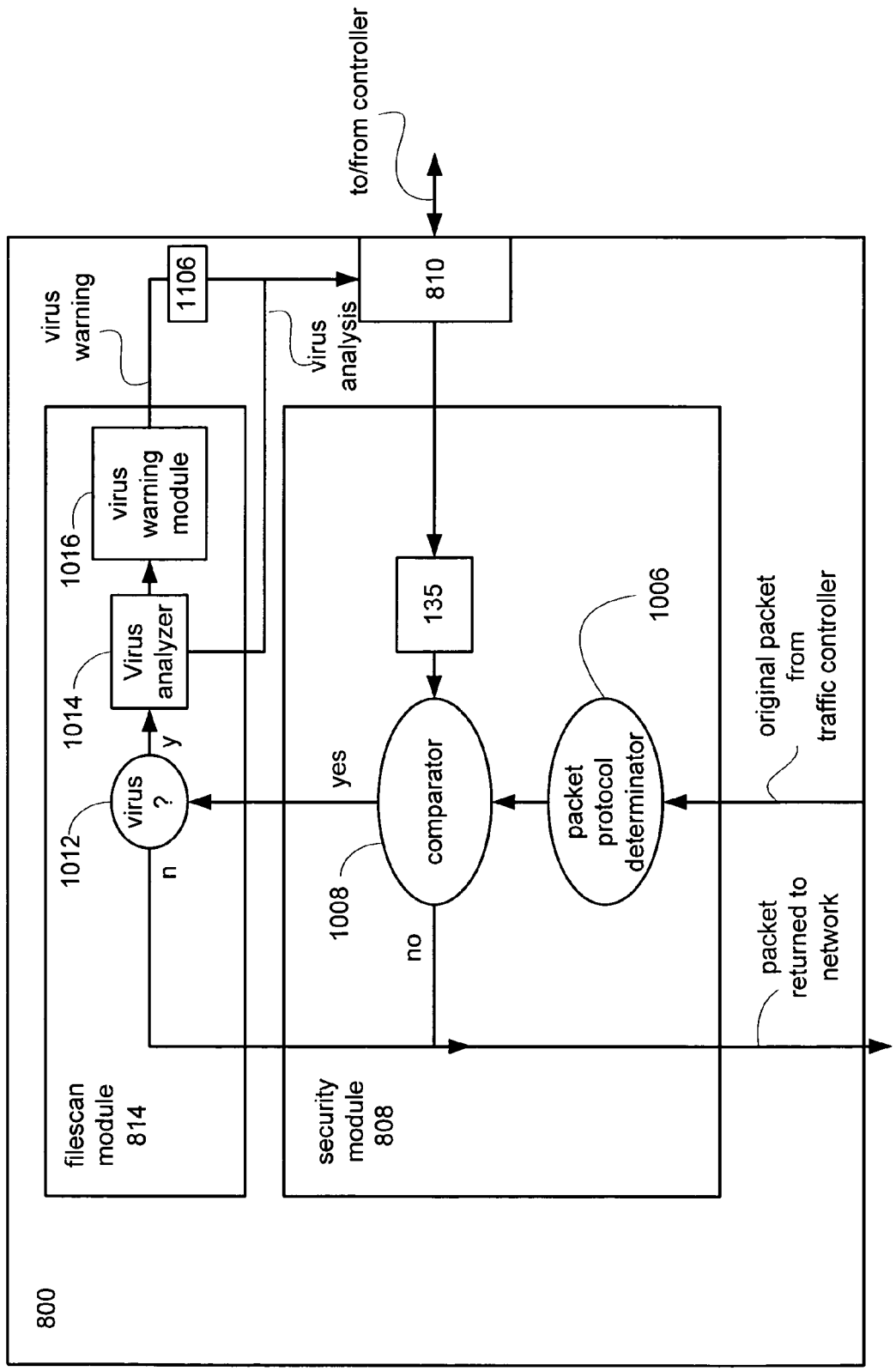
FIG. 11 illustrates an exemplary security module and file scan module of the virus monitor shown in FIG. 9 operational in inline mode.

In addition to operating in the standby mode (in order to preserve network bandwidth), virus monitor 102 can also be selected to operate in the inline mode when a full analysis and screening of data packets is required. Although, the inline mode somewhat reduces bandwidth by forcing almost all data packets through virus monitor 102, a virus outbreak can be effectively contained since any infected data packet is not returned to network 100 (as is in the case of standby mode), but is rather isolated from network 100 for analysis and ultimate discarding at the garbage collection unit 1010. Accordingly, FIG. 11 shows a virus monitor 1100 arranged to operate in the inline mode in accordance with an embodiment of the invention. When operating in the inline mode, the virus monitor 1100 has disabled the data packet copier unit 902 in such a way that all data packets are sent directly to the security module 808. In those cases where the security module 808 has determined that a particular data packet is not one that would likely be affected by a particular virus, that data packet is passed back to network 100 by way of the network interface 804. On the other hand, those data packets deemed more likely to be affected are passed directly to the file scan module 814. Those data packets found to be virus free are sent back to the network traffic flow by way of the network interface 804, whereas those data packets found to be infected by a virus are retained for further analysis, garbage collection, quarantine, etc. In some cases, the file scan unit 1104 will issue a virus report 1106 indicative of the virus analysis performed. Typically, the report 1106 will be forwarded to the controller 126 for further analysis and correlation with other reports generated by other virus monitors throughout network 100.

Flowchart Embodiments

The methodology of the invention will now be described in terms of a number of flowcharts each describing a particular process for enabling the invention. Specifically, FIGS. 12-18 describe a number of interrelated processes that when used singly or in any combination described aspects of the invention.

Figure 12:
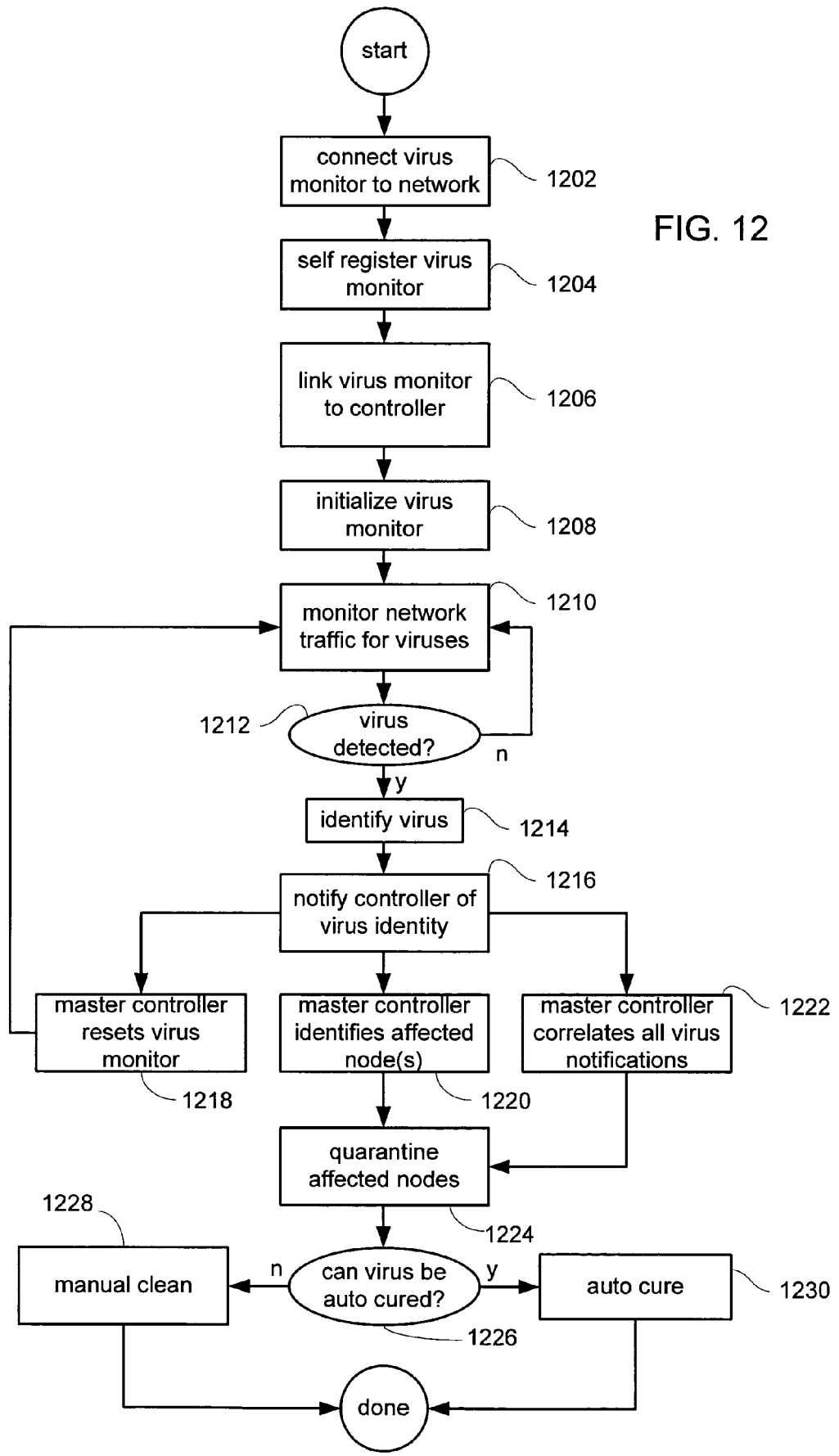
FIG. 12 shows a flowchart detailing a process for monitoring a network for a virus in accordance with an embodiment of the invention.

FIG. 12 shows a flowchart detailing a process 1200 for monitoring a network for a virus in accordance with an embodiment of the invention. The process 1200 begins at 1202 by connecting a virus monitor(s) to the network at any number of appropriate locations. Typically, these locations are those that provide the virus monitor with greatest visibility to any computing devices coupled thereto. For example, coupling the virus monitor between a tier 2 and a tier 3 switch typically provides a good vantage point for subsequent virus monitoring. Once the virus monitor has been connected to the network, the virus monitor self-registers at 1204. Such self registration includes identifying a location in the network (such as an IP address) associated with the virus monitor and/or identifying a location or locations of nearest controllers. Once a controller has been located, the virus monitor links itself to the located controller at 1206 at which point the virus monitor invokes an initialization procedure at 1208. Typically, the initialization procedure includes downloading a rules set and outbreak protection policy (OPP) file from a server computer by way of the controller.

Once the initialization procedure has completed, the virus monitor monitors the network traffic (i.e., typically a flow of data packets) for any of a number and kind of network viruses at 1210. If a virus is detected at 1212, then at 1214, the detected virus is identified or otherwise analyzed to provide an identity (if heretofore unknown virus). Once the virus has been analyzed and identified, the controller is notified of the identity of the virus at 1216. At this point, the controller performs any of a number of operations substantially simultaneously. Such operations include resetting the virus monitor at 1218 to provide a filtering type monitoring such that no data packet determined to be infected by the virus is passed back to the network traffic flow. In the described embodiment, this particular mode is referred to as inline mode as opposed to the as originally initialized standby mode in which data packets are copied for analysis thereby allowing the original data packets to be returned to the network traffic flow.

In addition to setting the virus monitor from the stand by mode to the inline mode, the controller identifies those client devices affected or most likely to be affected by the virus at 1220 and in those cases where a high level of security is necessary, the controller correlates all virus notifications for all virus monitors at 1222. Based upon the identification of the affected or possibly affected client devices and the correlation of the received virus notices, the controller quarantines those client devices determined to be affected and likely to be threatened at 1224. At 1226, a determination is made whether or not the virus can be auto cured. By auto cured it is meant that the virus is eliminated from the affected computers and any damage is repaired automatically. In some cases, all client devices are inoculated against further infection by the virus or related viruses. If it is determined that the virus can not be auto cured, then the affected client devices are manually cleaned at 1228, by for example, rebooting the computer system in the case of a computer worm, or in a worst case scenario, re-formatting the hard drives of the affected computers.

If on the other hand, it is determined that the affected computers can be auto cured, then at 1230 the affected computers are automatically cleaned thereby ending the process 1200. It should be noted that in the unlikely event that the computer(s) could not be cured of the virus in a timely and cost effective manner, the computers so affected will be disconnected from the network in order to preserver the integrity of the remaining interconnected devices.

Figure 13:
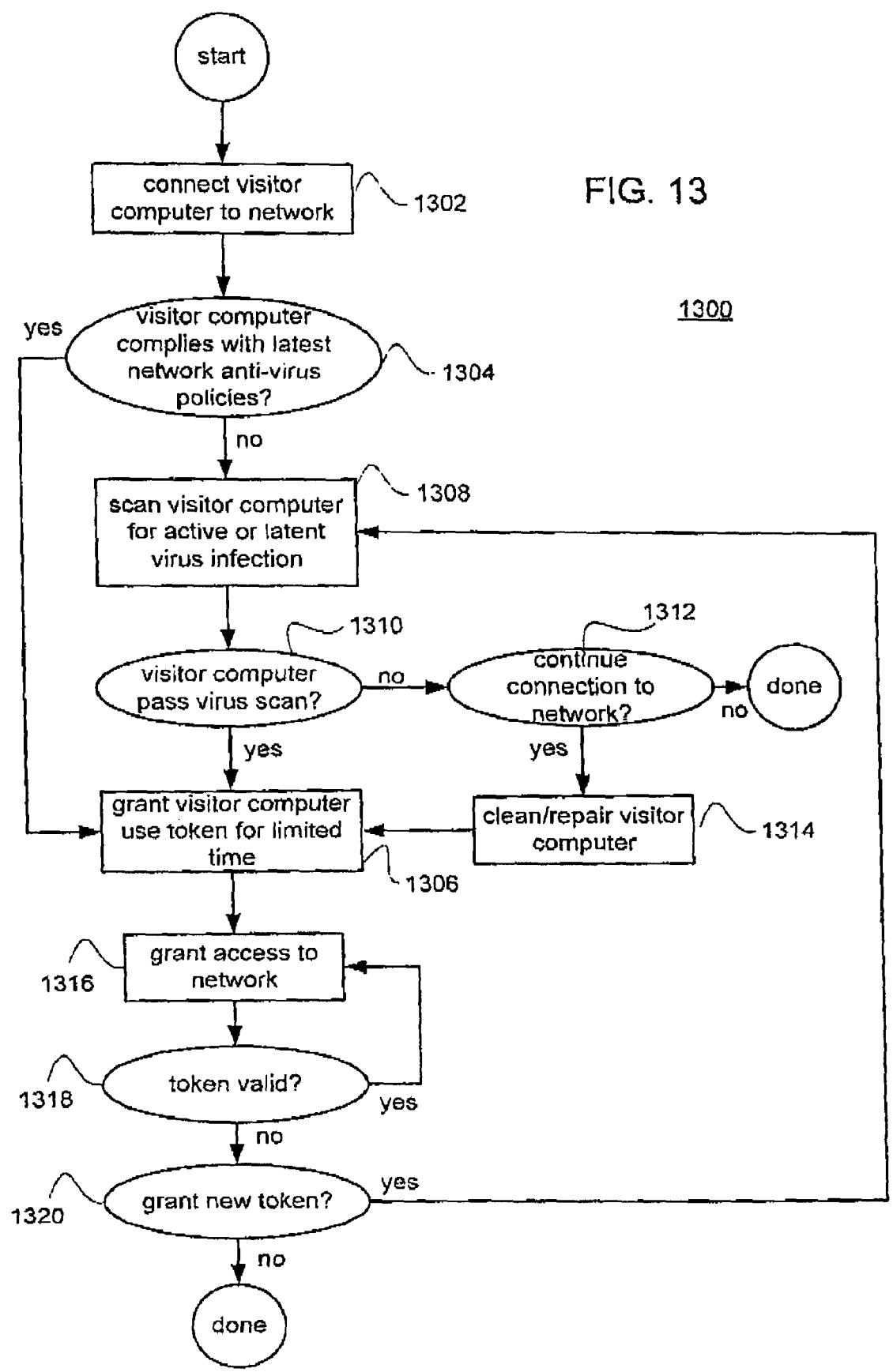
FIG. 13 shows a flowchart detailing a process for introducing a temporary new client device to the network in accordance with an embodiment of the invention.

In those situations where a visitor client device is connected to the monitored network, the visitor client device is introduced to the network using a process 1300 detailed in a flowchart shown in FIG. 13 in accordance with an embodiment of the invention. Accordingly, the process 1300 begins at 1302 by the visitor client device being connected to a visitor port included in a portion of the network being monitored. At 1304, a determination is made whether or not the visitor client device complies with the latest network anti-virus policies including acceptable anti-virus software. If it is determined that the visitor client device does comply, then the compliant visitor client device is granted a temporary use token at 1306 that provides network access for a limited amount of time as spelled out in the terms and conditions of the use token. Such terms and conditions can include various authority levels, security levels, and the like. Typically, the use token is for a continuous period of time and not cumulative thereby limiting the loss of availability for the visitor port to only that period of time.

If, on the other hand, the visitor client device is determined to be non-compliant, then at 1308 the visitor client device is scanned for any active or latent virus infections. If the scanned visitor client device passes the virus scan at 1310, then the visitor client device is granted the use token at 1306, otherwise, a determination is made at 1312 whether or not connecting the visitor client device to the network is to continue. If the connection is to end, then the process 1300 is ended without the connecting, however, if the connection is to continue, then at 1314, the infected visitor client device is cleaned and any damage repaired after which control is passed to 1306 where the use token is granted to the visitor client device.

Once the use token has been granted, access to the network is granted at 1316 during which periodic checks of the validity of the use token are made at 1318. In those cases where the use token has been determined to not be valid, then at 1320 a determination is made whether or not a new use token is requested. If a new use token is requested, then control is passed back to 1308 for scanning of the visitor client device to assure that no viruses have infected the requesting device, otherwise, the process 1300 ends normally.

Figure 14:
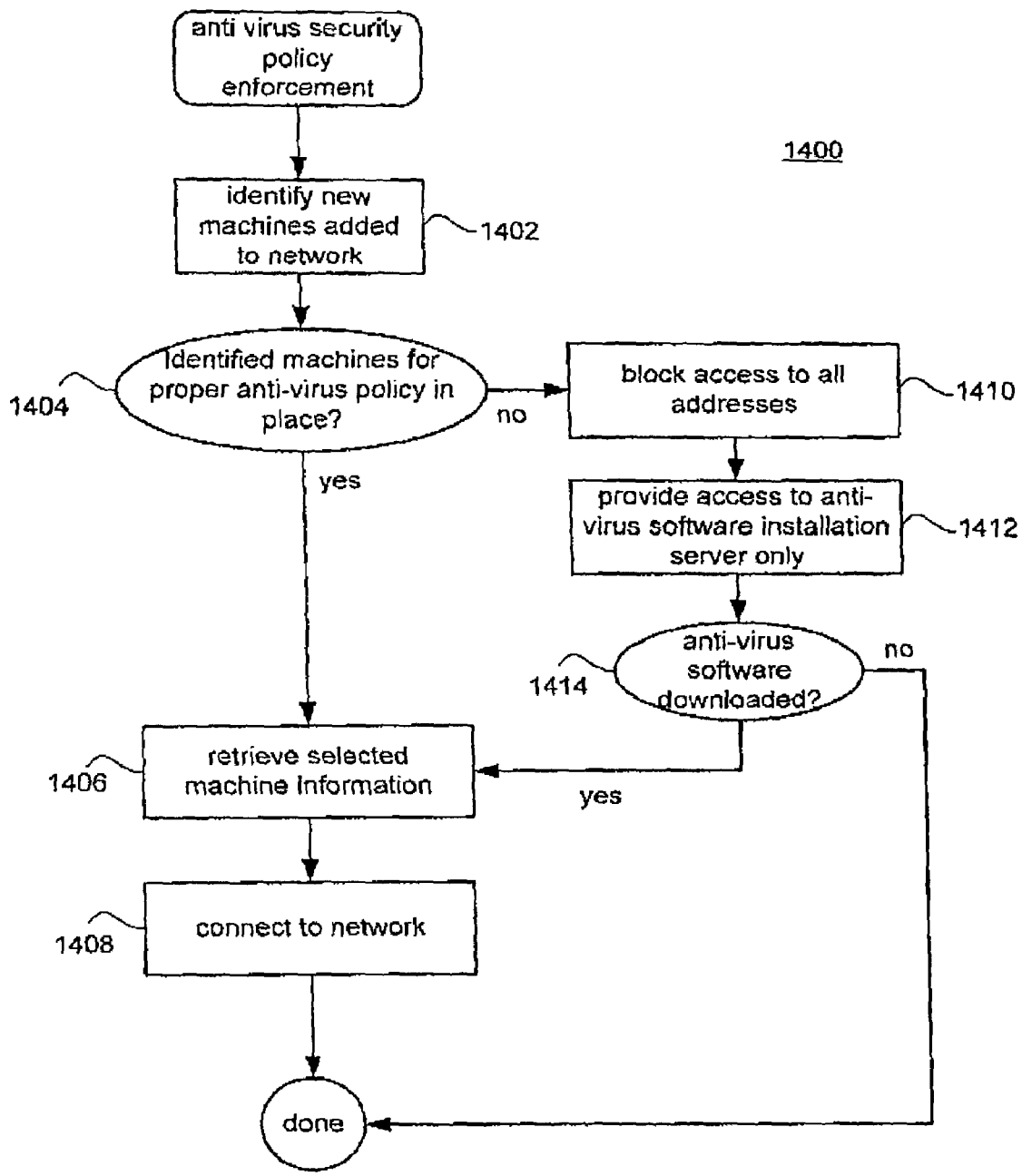
FIG. 14 shows a flowchart detailing a process for introducing a non-temporary new client device to the network in accordance with an embodiment of the invention.
Figure 15:
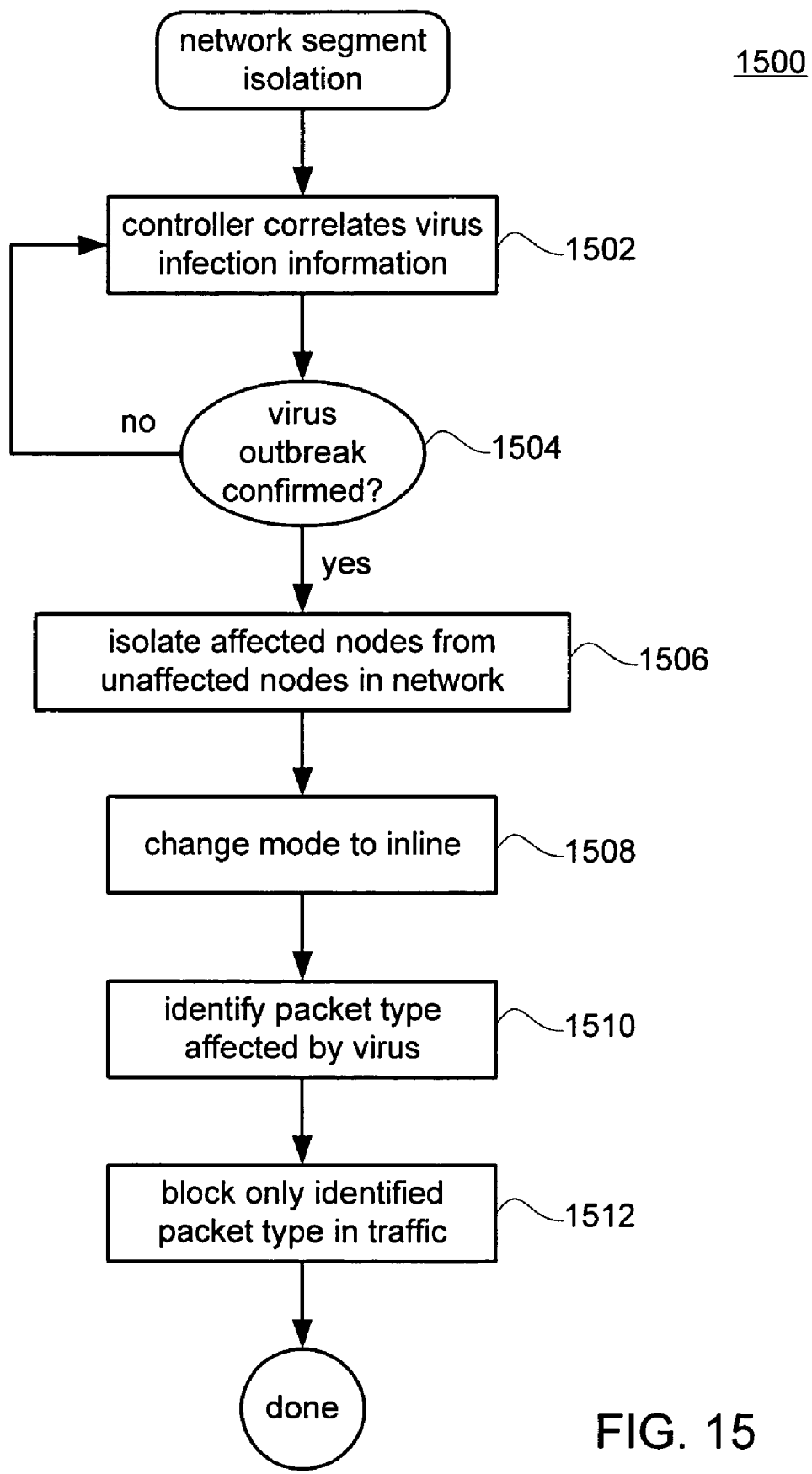
FIG. 15 shows a flowchart detailing a network segment isolation process in accordance with an embodiment of the invention.
Figure 16:
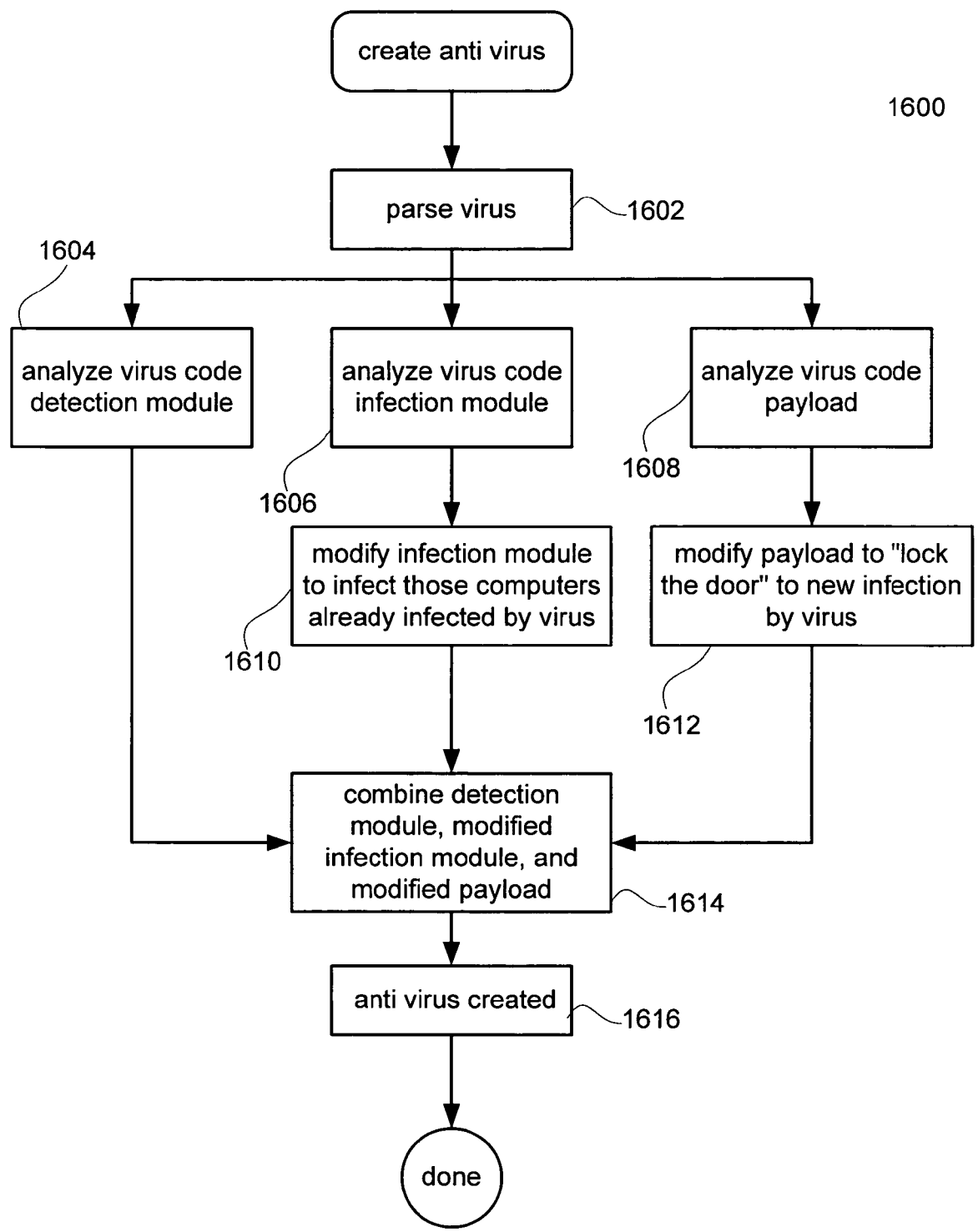
FIG. 16 shows a flowchart detailing a virus cleaning process in accordance with an embodiment of the invention.

In some cases, a new client device is permanently added to the network (as opposed to the temporary addition of a visitor client device) in which case a process 1400 shown in FIG. 14 is followed to assure compliance to anti-virus security policy. Accordingly, the process 1400 begins at 1402 by identifying a new client device to be added to the network. Identification typically includes identifying the type of system, resident operating system, installed anti-virus software (if any), network address (such as IP address), and the like. Once the new client device has been properly identified, then at 1404 a determination is made whether or not a proper set of anti-virus policies and protocols are in place. Such anti-virus policies and protocols include proper anti-virus software, filters, etc. Such appropriate anti-virus software can include any recognized anti-virus software from any number of recognized vendors such as Trend Micro of Cupertino, Calif., and the like.

If it is determined that the new client device does have the proper anti-virus policies and protocols in place, then at 1406, selected device information is retrieved. Such information can be related to the identification of the client device as well as any other appropriate information pertinent to the network connection and the new client device is connected to the network at 1408.

If, on the other hand, it has been determined that the proper anti-virus policies and protocols are not in place, then at 1410, all access to all addresses except to that of an anti-virus software installation server are blocked. Once access to the anti-virus software installation server is granted at 1412, then a determination at 1414 is made whether or not the appropriate anti-virus software is to be downloaded to the new visitor device. If it is determined that the anti-virus software is not to be downloaded, then the process 1400 ends without the new client device being connected to the network. Otherwise, control is passed to 1406 and finally to 1408 where the new client device is connected to the network.

Once all client devices are connected to the network, any virus attacks can be limited in scope by instituting a defensive measure referred to a network segment isolation whereby the affected portion of the network is logically isolated from the unaffected portion of the network. More specifically, a process 1500 shown in FIG. 15 describes in detail the network isolation process in accordance with an embodiment of the invention. Accordingly, the process 1500 begins at 1502 where a controller (or a system administrator) correlates various reports of virus attacks. When a number of reports have been correlated, the controller determines at 1504 whether or not a virus outbreak is confirmed. If a virus outbreak is confirmed, then the controller isolates the affected client devices (typically by way of network nodes to which the client devices are connected either physically or logically) at 1506. Once the outbreak has been confirmed, then the controller signals a virus monitor to switch operating mode to inline mode such that all data packets that constitute the network traffic are checked for the virus and related viruses at 1508. Once the virus is identified at 1510, the controller instructs the virus monitor to block only those data packets infected by that particular virus and related viruses at 1512.

Once the virus has been identified, an anti-virus (or curing agent) is created by way of an anti-virus creating process 1600 in accordance with an embodiment of the invention. Accordingly, the process 1600 shown in FIG. 16 begins at 1602 by the identified virus being parsed. By parsed it is meant that the various components of the various are identified. Such components include a infection module, a detection module, and a payload module. Once the various components of the virus have been identified, the components are analyzed. More specifically, the detection module is analyzed at 1604, the infection module at 1606, and the payload module at 1608. By analyzed, it is meant that the various virus components are studied to determine the method of infection in the case of the infection module and the deleterious effects of the virus payload portion can have on the infected systems.

It should be noted that the analysis can be performed concurrently or in any appropriate order. Once the various components have been analyzed, the infection module is modified to infect all computers already infected (regardless of the fact that a particular computer may already be infected by the parent virus) by the virus at 1610 and the payload module is modified to "lock the door" (i.e., prevent the virus from re-infecting the computer, or inoculating it from future virus attacks) at 1612. Once the various modules have been modified, the detection module (unmodified), the modified infection module, and the modified payload module are combined at 1614 to create the anti-virus at 1616. It should be noted that in some cases, the modified payload module provides a damage repair protocol that repairs the damage caused by the original virus.

Figure 17:
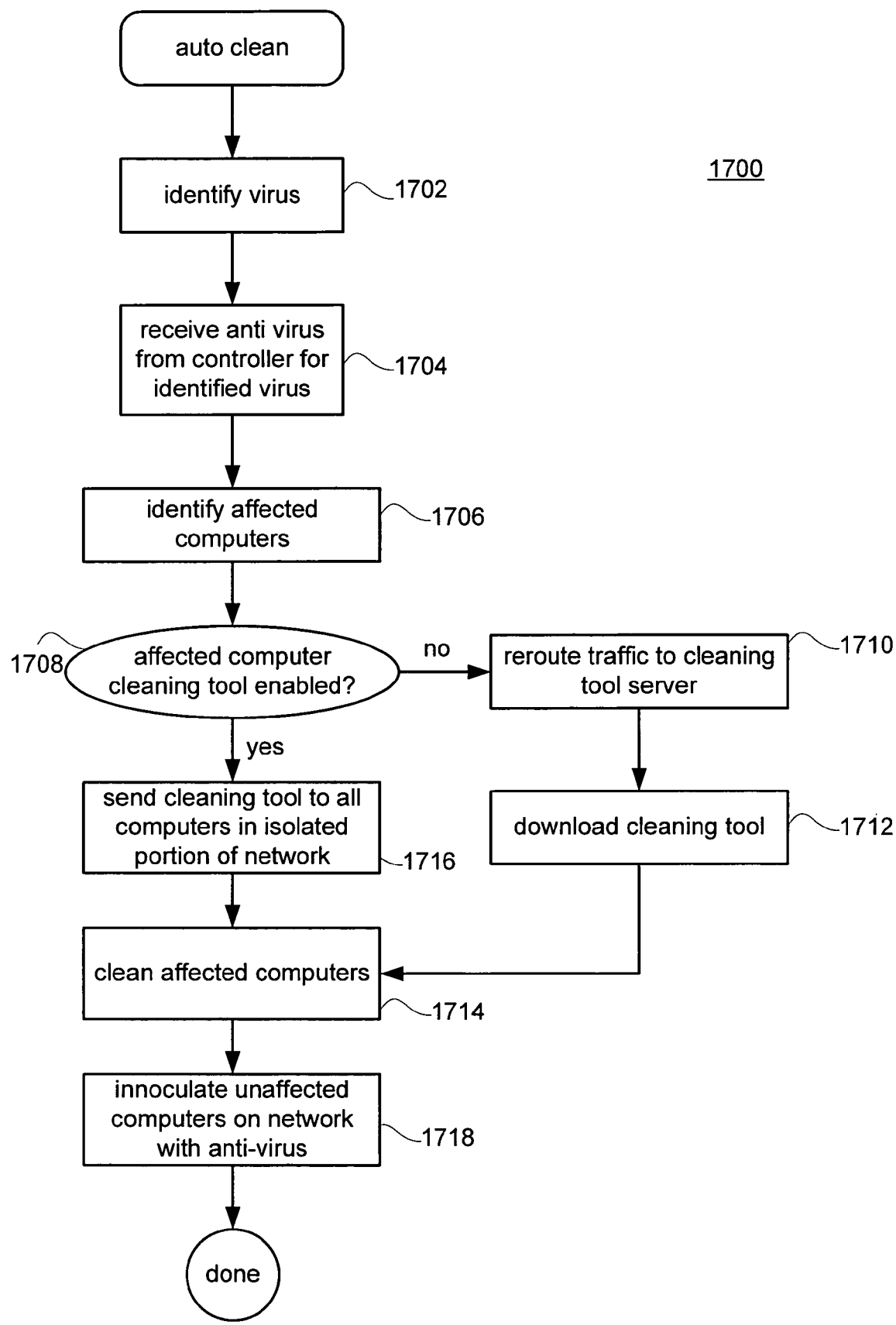
FIG. 17 shows a flowchart detailing a process for performing an automatic clean/cure of a group of infected computers in accordance with an embodiment of the invention.
Figure 18:
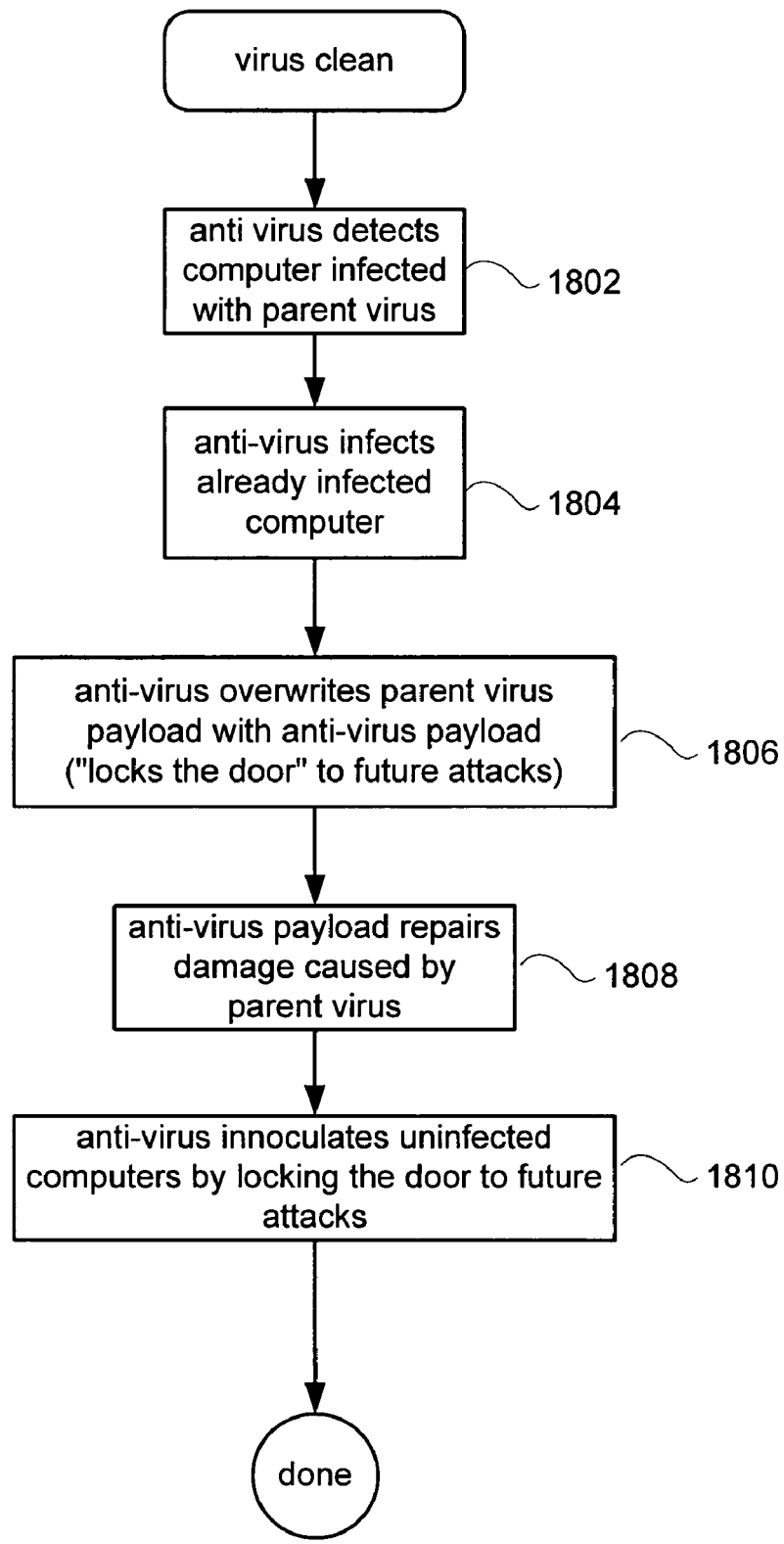
FIG. 18 shows an process for automatically cure and clean in accordance with an embodiment of the invention.

FIG. 17 shows a flowchart detailing a process 1700 for performing an automatic clean/cure of a group of infected computers in accordance with an embodiment of the invention. Accordingly, the process 1700 begins at 1702 by the acquiring of the identity of a particular virus found to be infecting a number of computers in a network. Once the identity has been acquired, at 1704, an associated anti-virus for the identified virus is received after which at 1706 the infected computers are identified. By identified it is meant that not only a physical location is known, but a logical location as well as any other pertinent information related to the computer. Once the location has been identified, a determination is made whether or not a cleaning tool has been installed in the identified computers at 1708. By cleaning tool it is meant a tool that uses the anti-virus generated for the particular virus to automatically clean/cure the infected computer. If a cleaning tool is not found, then all traffic to/from the infected computers are re-routed to a cleaning tool server at 1710 where at 1712 the appropriate cleaning tool is downloaded.

Once the appropriate cleaning tool has been downloaded, the infected computers are cleaned at 1714. Returning to 1708, if the appropriate cleaning tools are found, then the cleaning tool is sent to all infected computers in the network at 1716 such that at the cleaning commences at 1714. After the cleaning is completed, selected ones of the heretofore unaffected computers are inoculated against a future virus attack at 1718.

Once the anti-virus has been created, the anti-virus can be used to automatically clean any affected computers as well as inoculate unaffected computers thereby preventing any future virus outbreaks. The automatic cure/clean process 1800 is detailed in a flowchart illustrated in FIG. 18 where at 1802 the anti-virus detects a computer infected with the associated virus. Once the anti-virus has detected the affected computer, the anti-virus infects the computer already infected by the parent virus a 1804 while at 1806 the anti-virus overwrites the parent virus in the affected computer with the anti-virus payload. In some embodiments, the anti-virus payload results in inoculating the affected computer from future attacks by "locking the door" to the parent virus. Once the anti-virus payload has been downloaded, the anti-virus payload repairs any damage caused by the parent virus at 1808. Once the affected computers have been both inoculated and any damage repaired, the anti-virus inoculates unaffected computers at 1810. It should be noted that in the case of unaffected computers, since there is no damage caused by the parent virus, the anti-virus payload in not active and thereby remains dormant.

FIG. 19 shows a system block diagram of a computer system 801 which may be to implement the computing system 300 used to execute functions of the present invention including the scanning, deletion, modification, and quarantine of data packets suspected of harboring computer worms. The computer system 801 includes display monitor 803 and keyboard 809, and mouse 811. Computer system 801 further includes subsystems such as a central processor 851, system memory 853, fixed storage 855 (e.g., hard drive), removable storage 857 (e.g., CD-ROM drive), display adapter 859, sound card 861, speakers 863, and network interface 865. The central processor 851, may execute computer program code (e.g., an operating system) to implement the various aspects of the scan engine of the present invention as described herein. The operating system is normally, but not necessarily, resident in the system memory 853 during its execution. Other computer systems suitable for use with the invention may include additional subsystems or fewer subsystems. For example, another computer system could include more than one processor 851 (i.e., a multi-processor system) or one or more levels of cache memory.

The system bus architecture of computer system 801 is represented by arrows 867. However, these arrows are illustrative of any interconnection scheme serving to link the subsystems. For example, a local bus could be utilized to connect the central processor to the system memory and display adapter. Computer system 801 shown in FIG. 6 is but an example of a computer system suitable for use with the present invention. Other computer architectures having different configurations of subsystems may also be utilized.

Although a virus filter has been described, it can be appreciated that those skilled in the are often interchange terminology with regard to malicious code. Thus, the term "computer worm" can include any type of malicious or otherwise undesirable or unexpected computer code that presents itself at a computer, whether the code is actually referred to as a "virus", "worm", "Trojan horse", and the like. Further, although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:

1. In a distributed network of interconnected computing devices, a network virus monitor, comprising:
    a virus sensor operable in a number of modes arranged to detect a computer virus in the network such that the bandwidth of the network is minimally affected in a first mode in that original data packets continue to their destination after they are copied creating copied data packets which are analyzed for the computer virus, and wherein when the virus sensor detects the computer virus, the virus sensor switches to a second mode, wherein original data packets are analyzed and a subset of data packets determined to be infected or suspected of being infected are not returned to the network and wherein the virus monitor is able to automatically collect network environment data and assign an IP address to itself, and wherein the virus monitor automatically locates a controller in the network and registers itself with the controller, from where the virus monitor receives a rule set and an outbreak prevention policy (OPP); and
    a traffic controller coupled to the virus sensor and the network arranged to select certain data packets wherein the selected data packets are forwarded to the virus sensor.

2. A monitor as recited in claim 1, wherein the traffic controller further comprises:
    a data packet copier operable in the first mode and arranged to generate a copied data packet of each of the selected data packets wherein the selected data packets are returned to the network.

3. A monitor as recited in claim 2, wherein the data packet copier is disabled in the second mode such that the selected data packets are passed to the virus sensor.

4. A monitor as recited in claim 3, wherein the virus monitor further comprises:
    a data packet protocol identifier coupled to the virus sensor arranged to identify a data packet protocol associated with the data packet infected by a computer virus.

5. A monitor as recited in claim 4, wherein the selected data packets to be forwarded to the virus monitor are each associated with the data packet protocol associated with the computer virus.

6. A monitor as recited in claim 1, wherein the virus sensor unit further comprises:
    a filescan module arranged to scan a selected file for the computer virus.

7. A monitor as recited in claim 6, wherein the filescan is remotely located.

8. A monitor as recited in claim 7, wherein the remotely located filescan is used for scanning selected files larger than a set file size.

9. A method of monitoring a distributed network of computing devices for a computer virus at a virus monitor coupled to the distributed network, comprising:
    monitoring a flow of data packets in the network for the computer virus while minimally reducing the flow of data packets in a standby mode, wherein data packets continue to their destination after they are copied creating copied data packets which are analyzed for the computer virus, thereby preserving network bandwidth;

determining that at least one of the copied data packets is infected or suspected of being infected with the computer virus;

monitoring the flow of data packets in an inline mode wherein original data packets are analyzed and wherein data packets that are determined to be infected or suspected of infection are not returned to the flow of data packets; and initializing the virus monitor by automatically:
collecting network environment data;
assigning an IP address to the virus monitor;
locating a controller in the network; and
registering the virus monitor with the controller, from where the virus monitor receives a rule set and an outbreak prevention policy (OPP).

10. A method as recited in claim 9, further comprising:
isolating a portion of the network infected by the computer virus; and
cleaning the isolated portion of the network.

11. A method as recited in claim 9, further comprising:
sending a virus report to a controller.

12. A method as recited in claim 9, further comprising:
copying selected ones of the flow of data packets from corresponding
original data packets retrieved from the flow of data packets based upon a packet type; and
returning the retrieved data packets to the flow of data packets.

13. A method as recited in claim 12, wherein the packet type is determined by the detected computer virus.

14. A method as recited in claim 13, wherein a network bandwidth associated with the standby mode is minimally affected by the monitoring.

15. A computer-readable medium storing computer code for monitoring a distributed network of computing devices for a computer virus at a virus monitor coupled to the distributed network, the computer-readable medium comprising:
computer code for monitoring a flow of data packets in the network for the computer virus while minimally reducing the flow of data packets in a standby mode, wherein data packets continue to their destination after they are copied creating copied data packets which are analyzed for the computer virus, thereby preserving network bandwidth;

computer code for determining that at least one of the copied data packets is infected or suspected of being infected with the computer virus;

computer code for monitoring the flow of data packets in an inline mode wherein original data packets are analyzed and wherein data packets that are determined to be infected or suspected of infection are not returned to the flow of data packets;

computer code for automatically collecting network environment data at the virus monitor;

computer code for automatically assigning an IP address to the virus monitor; and computer code for automatically locating a controller in the network and registering the virus monitor with the controller, from where the virus monitor receives a rule set and an outbreak prevention policy (OPP).

16. A computer-readable medium as recited in claim 15, further comprising:
computer code for isolating a portion of the network infected by the computer virus; and
computer code for cleaning the isolated portion of the network.

17. A computer-readable medium as recited in claim 15, further comprising:
computer code for sending a virus report to a controller.

18. A computer-readable medium as recited in claim 15, further comprising:
computer code for copying selected ones of the flow of data packets from corresponding original data packets retrieved from the flow of data packets based upon a packet type; and
computer code for returning the retrieved data packets to the flow of data packets.

19. A computer-readable medium as recited in claim 18, further comprising:
computer code for determining the packet type using the detected computer virus.

20. A computer-readable medium as recited in claim 19, wherein a network bandwidth associated with the standby mode is minimally affected by the monitoring.

* * * * *